United States Patent [19]
Walmsley

[11] Patent Number: 5,604,857
[45] Date of Patent: Feb. 18, 1997

[54] RENDER SYSTEM FOR THE RENDERING OF STORYBOARD STRUCTURES ON A REAL TIME ANIMATED SYSTEM

[76] Inventor: Simon R. Walmsley, 3/9 Pembroke Street, Epping, New South Wales 2112, Australia

[21] Appl. No.: 644,714

[22] Filed: May 10, 1996

Related U.S. Application Data

[63] Continuation of Ser. No. 181,246, Jan. 13, 1994, abandoned.

[30] Foreign Application Priority Data

Jan. 15, 1993 [AU] Australia .................................. PL6833

[51] Int. Cl.$^6$ ................................................... G06T 13/00
[52] U.S. Cl. ........................................... 395/173; 395/806
[58] Field of Search .................................. 395/152, 153, 395/154, 121; 434/185

[56] References Cited

U.S. PATENT DOCUMENTS

| | | | |
|---|---|---|---|
| 4,616,217 | 10/1986 | Nesbitt et al. | 395/121 |
| 4,884,972 | 12/1989 | Gasper | 434/185 |
| 4,951,229 | 8/1990 | DiNicola et al. | 395/152 |
| 5,046,026 | 9/1991 | Tolomei | 395/152 |
| 5,093,907 | 3/1992 | Hwong et al. | 395/152 |
| 5,274,758 | 12/1993 | Beitel et al. | 395/154 |
| 5,353,404 | 10/1994 | Abe et al. | 395/164 |

OTHER PUBLICATIONS

Mediamaker, MacroMind, Inc., 1990, pp. 17 and 22–25.
Yamamoto, U.S. Patent Application Ser. No. 08/144,655, filed Nov. 2, 1993.

*Primary Examiner*—Mark K. Zimmerman
*Assistant Examiner*—Stephen Hong
*Attorney, Agent, or Firm*—Fitzpatrick, Cella, Harper & Scinto

[57] ABSTRACT

Video and other forms of animation are traditionally manually laid out on storyboards which set out the nature and timings of the events for which animation is desired. The storyboard then forms a plan for implementation in the creation of a visual performance. An automated storyboard system allows the user to flexibly create different sequences of animation clips and to be able to easily alter the ordering and nature of the clips, with the storyboard being automatically rendered on an audio and video processing system.

18 Claims, 12 Drawing Sheets

| RTO Processor Object List |•→

*Fig. 9*

| Sound Data |•→
| Sound Duration |
| # Iterations |

*Fig. 10*

| X Translation |
| Y Translation |
| Z Translation |
| Zoom |
| Trans Changed |
| Zoom Changed |
| TimelineRef |•→

*Fig. 11*

| Base Value |
|---|
| Camera Value |

*Fig. 20*

| #Shapes |
|---|
| Shapes |
| TimelineRef |
| RTO ObjectList1 |
| RTO ObjectList2 |

*Fig. 21*

| # Colours |
|---|
| Base Colour# |
| CMU Colour Group |
| TimelineRef |
| Animated X Blends |
| Animated Y Blends |
| Changed Colour |
| # OpaqueEffects |
| # TranspEffects |
| Base Effect# |
| Changed Effect |
| CMU Effect Group |

*Fig. 22*

RENDER SYSTEM FOR THE RENDERING OF STORYBOARD STRUCTURES ON A REAL TIME ANIMATED SYSTEM

This application is a continuation of application Ser. No. 08/181,246 filed Jan. 13, 1994, now abandoned.

FIELD OF THE INVENTION

The present invention relates to the display of video animation and in particular, the rendering of video segments to produce a multilevel simultaneous display of multiple video clips.

BACKGROUND ART

Traditional film production techniques usually involve the shooting of multiple video or film 'takes' or 'clips'. Normally much more film is shot than is required for the final result. The resultant film is normally edited by a film editor who uses scissor like splicers and adhesive tape to cut and paste the desired shots together. Artistic decisions about the selection of shots to enhance the performance are made and a final result produced.

If dissolves or wipes are required between two sources, then the processing becomes much more complicated, often involving the use of multiple video recorders and vision switchers.

Although editing and mixing can be implemented on a frame by frame basis, it is desirable to be able to format the editing/production process with what is known in the industry as a "storyboard". The storyboard represents a plan of the film video or animation that is to be created and assists in the visualization of the production. Storyboards are traditionally created by hand, going through many interactions and revisions during production and is basically a chart of various sources of audio/video and how they are to be combined over time to produce the final film. Furthermore, as a director, or the like may wish to alter the production once an initial storyboard has been created, it is highly desirable that the storyboard itself be readily editable.

Recently, computer systems have been introduced which go part of the way to automate this process. Typically, these systems require animations to be created on a frame by frame basis, saving each frame to disk, with the image being played back at a later date by reading each frame off the disk and displaying it on a computer screen or the like.

Recently, in Australian Patent Application No. 38238/93 (Attorney Ref: (RTO1)(224857)), entitled "An Audio and Video Processor System", claiming priority from Australian Provisional Patent No. PL2141 filed 29th April, 1992, the contents of which are hereby incorporated by cross-reference, a video animation system was proposed that was capable of producing real-time video animation through the use of real-time object (RTO) technology. That document, and other co-related documents describe apparatus that can perform audio and video mixing, editing, sampling, and the like at a substantially reduced cost than that of prior art arrangements. For a discussion of RTO technology, the reader is referred to Australian Patent Application No. 38244/93 (Attorney Ref: (RTO7)(202788)), entitled "A Real-Time Object Based Graphics System" claiming priority from Australian Provisional Patent No. PL2147, filed 29th April, 1992, the contents of which are hereby disclosed by cross-reference.

Australian Patent Application No. 53184/94, corresponding to U.S. patent application Ser. No. 08/181,247, entitled "Storyboard System for the Simultaneous Timing of Multiple Independent Video Animation Clips" claiming priority from Australian Provisional Patent No. PL6835, filed 29th April, 1992 and filed simultaneously herewith, the contents of which are hereby incorporated by cross-reference discloses an automated storyboard system capable of editing, ordering and timing multiple simultaneous portions of animation or video source information.

Hence there exists a general need for a system capable of taking audio and/or video source information and rendering it in real time on an audio and video processing system (AVAPS) such as that disclosed in the abovementioned patent application.

It is an object of the present invention to provide an automated storyboard mechanism capable of the automated rendering of multiple video clips on a audio and video animation processor system to produce real time video animation.

SUMMARY OF THE INVENTION

In accordance with the present invention, there is provided an automated storyboard rendering system for the reproduction of a storyboard on a real-time processor, said storyboard comprising a number of columns each containing references to at least one information clip intended for reproduction, said system comprising:

current column determination means adapted to determine those information clips that are active in a current column, and column rendering means connected to said column determination means and adapted to receive said currently active column and simultaneously render those information clips in said currently active column.

Preferably said column rendering means renders the animation clips in real time.

BRIEF DESCRIPTION OF THE DRAWINGS

A preferred embodiment of the present invention will now be described with reference to the accompanying drawings in which:

FIG. 9 illustrates an element of the render list.

FIG. 10 illustrates the sound information structure.

FIG. 11 illustrates the camera information structure.

FIG. 20 illustrates the structure of the handle transform.

FIG. 21 illustrates the structure of the shape information.

FIG. 22 illustrates the structure of the colour information.

DESCRIPTION OF THE PREFERRED EMBODIMENT

Figure 1:
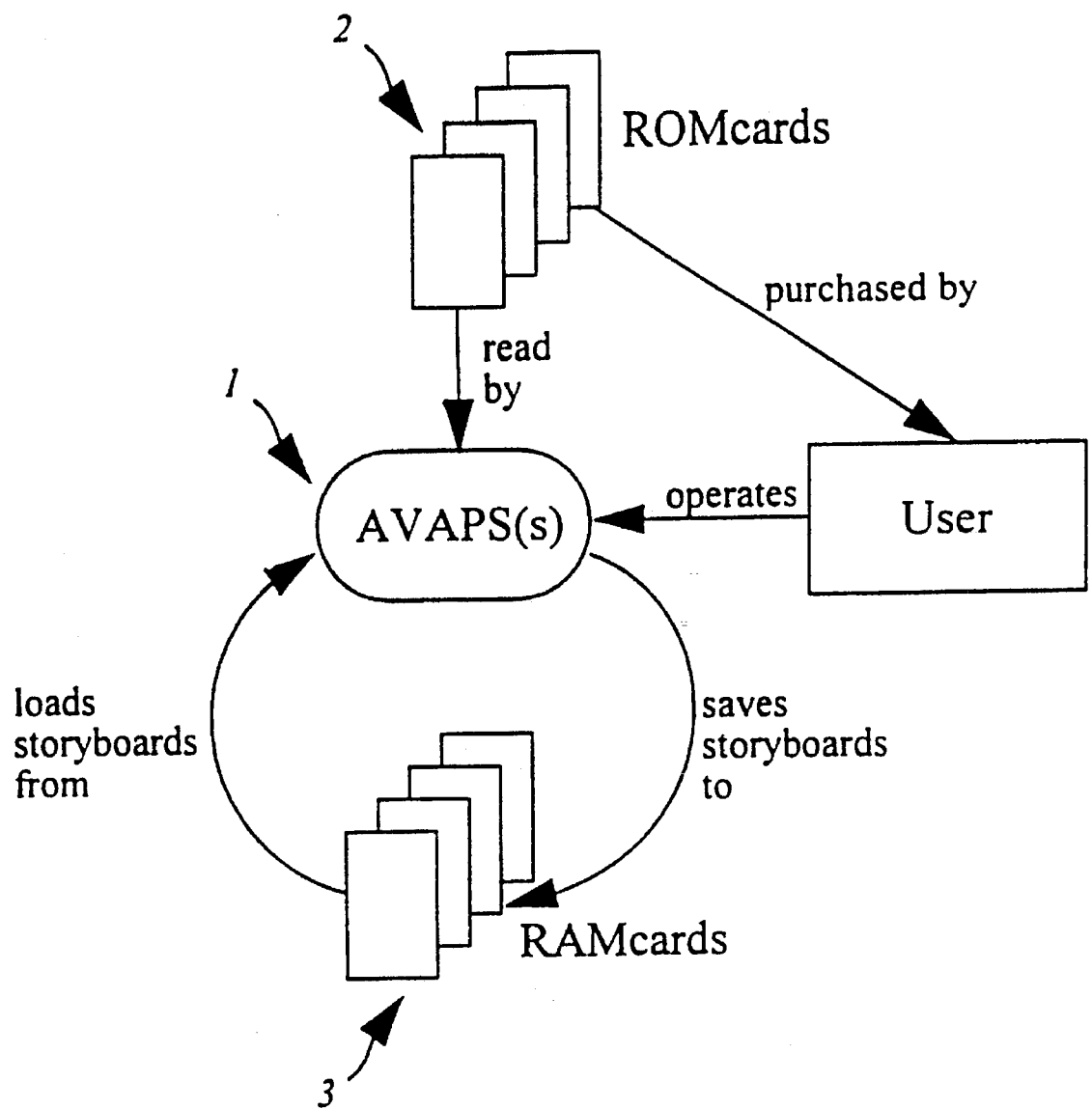
FIG. 1 illustrates the AVAPS system and its operational environment.

Referring now to FIG. 1 there is shown the AVAPS 1 and its operational environment. Users purchase ROMCards 2, and operate the AVAPS 1 to sequence clips from the ROMCards 2 into storyboards. Storyboards are played on one or many AVAPSs. Users can edit and save their sequenced clips (storyboards) onto RAMCards 3 for future use.

Figure 2:
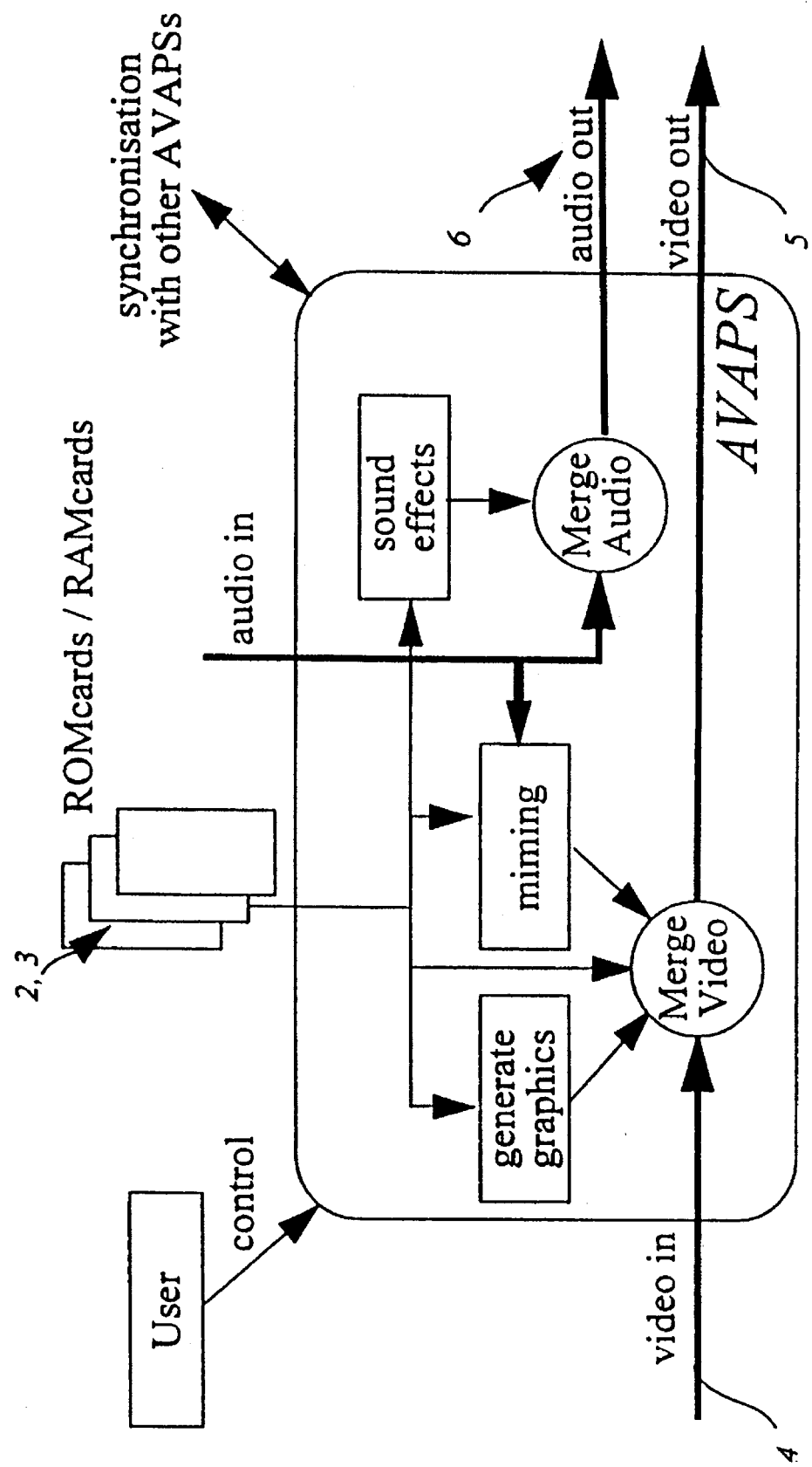
FIG. 2 illustrates the AVAPS system in more detail and its operational environment.

Referring now to FIG. 2 there is shown the AVAPS system in more detail. When playing a storyboard, the AVAPS 1 generates graphics and selects shapes for miming based on audio input. These generated images are merged in a controlled manner with an incoming video signal 4, producing an output video signal 5. Sound effects are also generated, merged with the input audio signal and leave the AVAPS 1 in the form of audio out 6. Limited run-time animation control can be provided by the user, and a limited amount of synchronization can occur with other the AVAPSs.

The overriding emphasis in the AVAPS 1 is on giving the user easy access to sophisticated but canned animations, which the user can modify in simple ways and combine to achieve the desired effect. It will be appreciated by those skilled in the art that while the AVAPS 1 operates on both audio and video information, either input or canned, corresponding arrangements can be configured for operation on either audio or video information only.

A clip is a predesigned 'canned' animation component that contains graphics and sound. A clip is capable of manipulating shapes, position, size, and colour and synchronizing with the user (e.g. by means of a keypress).

Clips can contain user-editable components (such as editable text) and fixed (non-editable) components. The author can specify defaults for all of the user-editable components, so that a clip can be used without any customization.

Each clip provided by the author has a duration type. The type is one of:

fixed, where the clip can determine its duration without outside constraints (i.e. by examining its own components). For example, a clip may show scrolling credits at a constant speed. The number of lines of text to scroll will determine the duration of the clip.

unknown, where the clip has no idea of its duration, nor can it easily work it out. For example, if a clip waits for the user to press a key, the clip will not know ahead of play-time how long it will be before the user presses the key; and infinite, where the clip has no duration limit, and will display for as long as the user wishes it to. An example of this is a background image behind some sequenced animation. The background image should be displayed as long as necessary in the animation. Typically, a clip with infinite duration will need to be tied to the duration of another clip. For instance, a background image should be tied to last as long as the scrolling credit clip lasts:

The preferred embodiment of a storyboard system is configured to allow a user to:

select a clip from ROMCards 2;

edit those components of a clip that are editable;

play a clip; and sequence, layer and synchronize multiple clips,

The user can decided to combine clips into a storyboard. The storyboard represents the display order and sequence of the clips. It indicates which clips are run together, what dependencies they have on their starting and finishing times, and what display order in terms of relative visual priority each clip has.

Consequently a storyboard represents:

time order. This includes representing clips that run in parallel (clip A run at the same time as clip B), and sequence (clip A follows clip B);

display order. This includes representing the relative display order priorities of clips that are active at the same time (clip A should be displayed above clip B); and synchronization. This includes starting and stopping clips together (clip A should terminate when clip B terminates) as well as clip markers for random access during playback.

Users can perform the following functions with a storyboard in an easy to use manner:

create;

save to a RAMcard;

load from a RAM/ROMcard;

edit (both the storyboard and the clips in the storyboard); and play.

Figure 3:
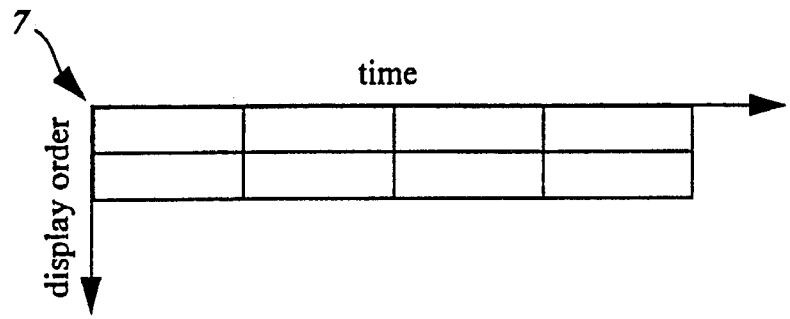
FIG. 3 illustrates a simple storyboard containing 4 columns, two rows, and therefore 8 cells.

Referring now to FIG. 3 there is shown a simple storyboard containing 4 columns, two rows, and therefore 8 cells. A storyboard is conceptually like a spreadsheet, with rows, columns, and cells. Consecutive columns represent consecutive time segments, and rows represent display order within a time segment. Both dimensions are relative rather than absolute. Thus each column may represent a different length of time.

A storyboard is read from left to right, one column at a time. Each column represents one time segment, and the cells in each column represent relative display levels during that time segment.

Each cell within a column may contain one of the following items:

nothing. If a cell contains nothing, it means that there is nothing of consequence happening during that time segment on that relative display level.

a clip. If a cell contains a clip, it means that the clip starts at the beginning of the cell's time segment at that cell's relative display level.

a continuation marker. If a cell contains a continuation marker, it means that the clip that began in an earlier time segment on this same row is continuing through this cell's time segment.

Each cell also has a stopped flag, which indicates if the clip is to be forced to stop at the end of that cell's time segment. Additionally, each column can have a clip marker associated with it as long as there is a clip in that column.

The length of time represented by a particular column is defined to be the minimum time of all cells in that column. All clips that are in a particular column are defined to start together. Their finishing times will vary depending on the length of each clip. The length of the column will therefore be the length of the shortest clip. All other clips will then continue into the next column (or time segment) via a continuation marker. The length of the next column will be the shortest of all remaining time for each clip and any new clips that have started in that column. For the purposes of calculating a minimum, an unknown duration is treated as zero time, and an infinite duration is treated as infinite.

From this it can be seen that continuation markers are automatically added and removed by the AVAPS 1, and therefore the number of columns that exist in a storyboard changes dynamically based on the number of time segments that are required to represent the clips.

A clip can be terminated prematurely by setting the stopped flag in a cell. This can be accomplished directly (e.g. by changing the stopped flag explicitly), or indirectly (e.g. by starting another clip where a continuation marker existed previously). In either case, the clip will then terminate at the end of the column, regardless of how much time was remaining on that clip.

Storyboards also contain user-defined clip markers. Each column can have a clip marker associated with it provided there is at least one clip in that column. The clip marker refers to all clips that begin in the column.

Given the above representation of a storyboard, it is possible to interpret the meaning of a given storyboard.

Figure 4:
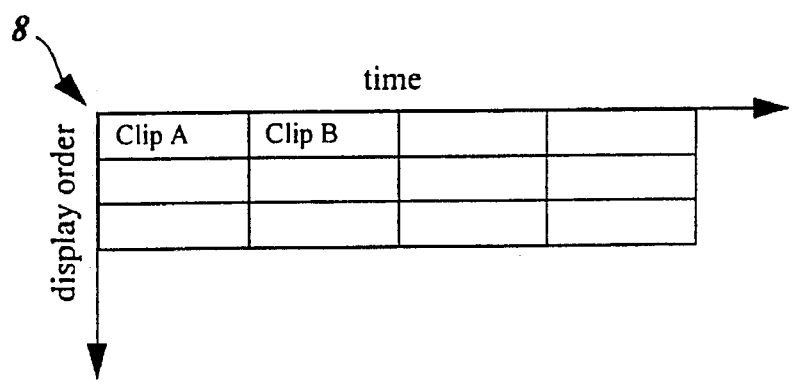
FIG. 4 illustrates two clips in a sequence.

Referring now to FIG. 4 there is shown a storyboard having two clips in a sequence, clip A and clip B. The first column is of length clip A, and the length of the second column is of length clip B. Consequently clip A is run first, then clip B is run when clip A has finished. This is true regardless of the length of A or B. If clip A had an unknown duration, then clip B would be run only when clip A finished (however long that was). If clip A had an infinite duration, then clip B would never be run, as clip A would never terminate.

Figure 5:
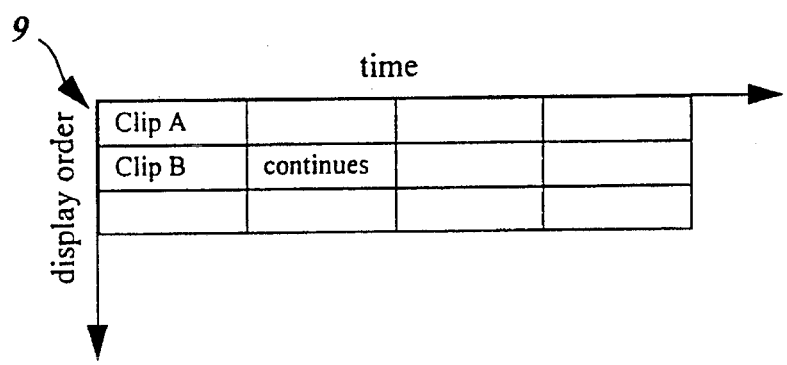
FIG. 5 illustrates two clips in a parallel.

Referring now to FIG. 5 there is shown a storyboard having the same two clips in parallel. The first column has the two clips, so its length is of the shortest of the two clips (i.e. clip A). As clip A has finished by the end of the first time-segment, it does not continue to the next time-segment. Consequently, the second column has a continuation marker in the cell of the same row that clip B was in, to indicate that it continues to the next time-segment. The minimum time of the clips active in this second time-segment is the time (clip B—clip A).

The relative display order of the two clips is apparent from the storyboard. Clip A is displayed on a higher priority to clip B, therefore when rendering the storyboard, if an object from clip A is drawn overlapping an object from clip B, the viewer will see the object from clip A on-top-of the object from clip B.

The first column represents the starting time of the animation, the second column represents the time when clip A has finished (and B is continuing), and the third column represents the time when clip B has finished.

Figure 6:
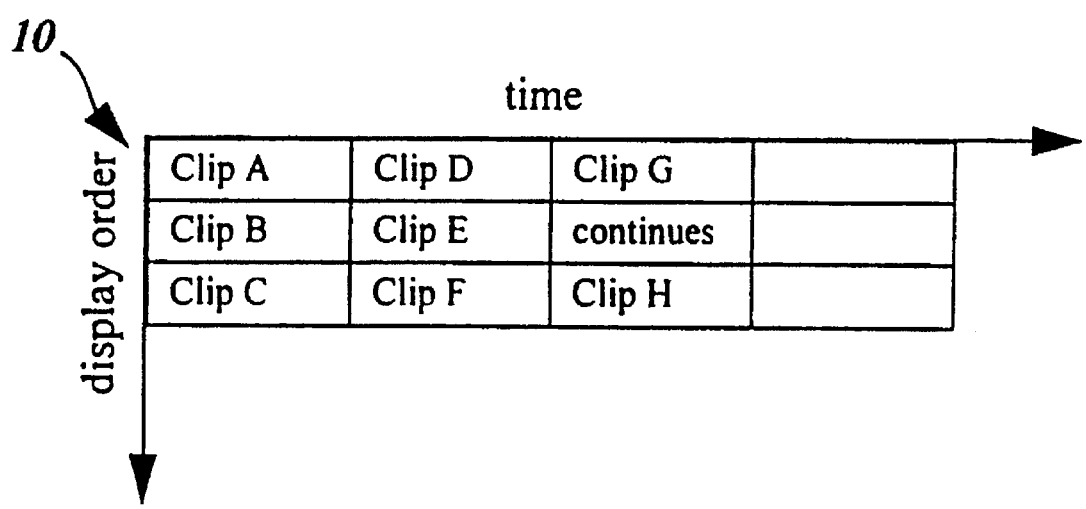
FIG. 6 illustrates a storyboard example that could be used for a presentation describing the uses of a particular product in two countries.

Referring now to FIG. 6 there is shown a storyboard example that could be used for a presentation describing the uses of a particular product in two countries. Clips A, B, and C (the first column) may represent the animated company logo and title. Clip D may represent the text describing the product's use in the first country, while clip G may represent the text describing the product's use in the second country. Clip E represents the graphic of the product itself, while clips F and H represent the graphical maps of the two countries.

The first column contains clips A, B, and C. If clips A and B have their stopped flags set, they will both terminate when clip C terminates. i.e. the animated title and logo will be on the screen for the duration of the delay clip C.

The second column shows that clips D, E, and F are started simultaneously when clips A, B, and C terminate. Clip F is terminated by the shortest clip in the column (clip D), and clip E continues after clips D and F are terminated. The third column shows that clips G and H start when D and F terminate, and finally all clips terminate when clip G finishes.

The storyboard is changed by performing actions on cells and columns in the storyboard. Each action affects the cell, and then the storyboard is re-evaluated. Effectively, the minimum time for the cell's column is recalculated, and this calculation is propagated as far as required.

A full description of one possible storyboard structure suitable for use with the preferred embodiment is given in Australian Patent Application No. 53184/94, corresponding to U.S. patent application Ser. No. 08/181,247 entitled "Story Board System for the Simultaneous Timing of Multiple Independent Video Animation Clips", claiming priority from Australian Provisional Patent No. PL 6835, filed 15 Jan., 1993, the contents of which are hereby incorporated by cross-reference.

Figure 7:
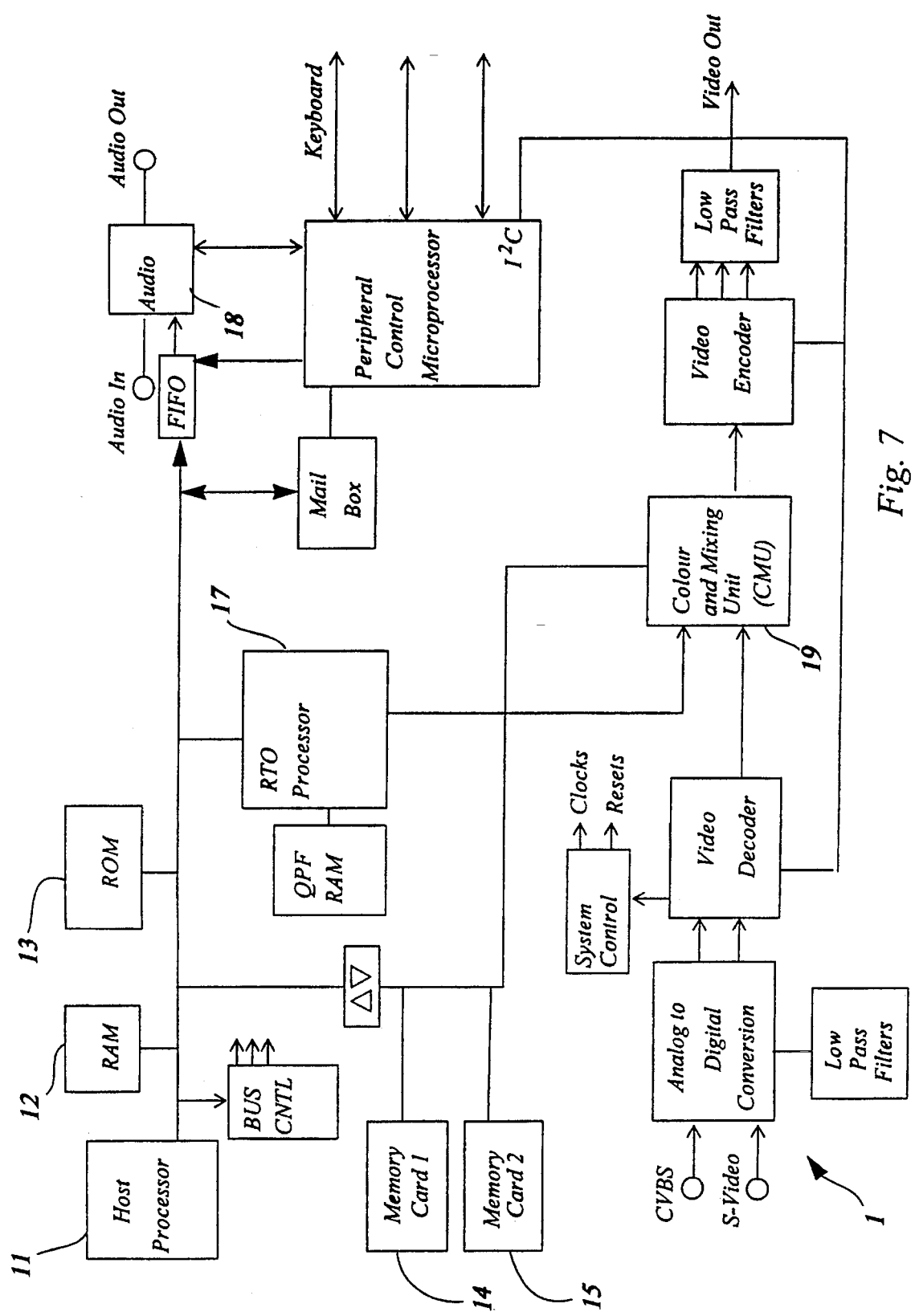
FIG. 7 is a schematic block diagram representation of an AVAPS system such as that shown in FIG. 2.

Referring now to FIG. 7 there is shown the example of an AVAPS system such as that shown in FIG. 2 in still more detail. In order to display the clips corresponding to those set out in the story board, the corresponding clips must be rendered by the AVAPS 1. The AVAPS 1 has a host processor 11 that is responsible for the formation of storyboard structures in its system RAM and the subsequent rendering thereof by an RTO processor 17 such as that disclosed in Australian Patent Application No. 38244/93, entitled "A RealTime Object Based Graphics System", claiming priority from Australian Provisional Patent No. PL 2147, filed 29 Apr., 1992, and the contents of which are hereby incorporated by cross-reference.

The following high level functions are required to be performed by the rendering software system of the host processor 11 which acts as a "Renderer":

play a storyboard from a column;

pause;

continue;

stop;

notify; and get an error message.

These different functions are described in the following paragraphs:

Play Storyboard

This causes the renderer to stop preparing the column that is due to start next, and instead, to prepare the specified column from the specified storyboard. When the preparation of the column is complete, the currently animating column from a storyboard will stop animating, and the new column (and storyboard) will animate in its place. When the end of the storyboard is reached (i.e. no more clips to play in any subsequent columns), the animation will loop to the first column in the storyboard.

The following parameters are required:

the address of the storyboard to play;

the column number to start playing from;

a flag indicating whether a notify event is required; and a column to be used for the notify event (only valid if a notify event is required).

The following errors are possible during execution of this command:

external variables unresolved;

ROMcards not present;

column out of range; and column is empty.

Pause

This causes the renderer to freeze the current display so that no further animation takes place until a Continue call occurs.

No parameters are required.

The following errors are possible:

storyboard is not playing; and storyboard already paused.

Continue

This causes the renderer to continue an animation that was paused by the Pause command, or by a Pause Handle. Continuing a Pause command takes precedence over continuing an internal Pause Handle.

No parameters are required. The following errors are possible:

storyboard is not playing; and storyboard is not paused.

Stop

This causes the renderer to stop playing any animation, and to set the screen to black.

No parameters are required. The following error is possible:

storyboard is not playing.

Notify

This causes the renderer to post a PlayingColumn Event to a Storyboard application 34 (seen in FIG. 8 and described further hereinafter) when the specified column is reached.

The following parameters are required:

the column number to cause the PlayingColumn Event; and a flag to determine whether the Event should be posted if the current column is past the specified column (this can be used to post an event next time through the looping of the storyboard).

The following errors are possible:

storyboard is not playing; and column out of range.

Get Error Message

The parameter for this operation is:

the error code to get the message for.

This cannot fail, and always returns an error message. If the error code passed to the function is out of range, an out-of-range error message will be passed back.

Valid errors can include:

no error;

external variables unresolved;

ROMcards not present;

column out of range;

storyboard is not playing;

storyboard is not paused;

column already paused;

column is empty; and illegal reference number.

Overview of Data and Processes in Storyboard Renderer

Figure 8:
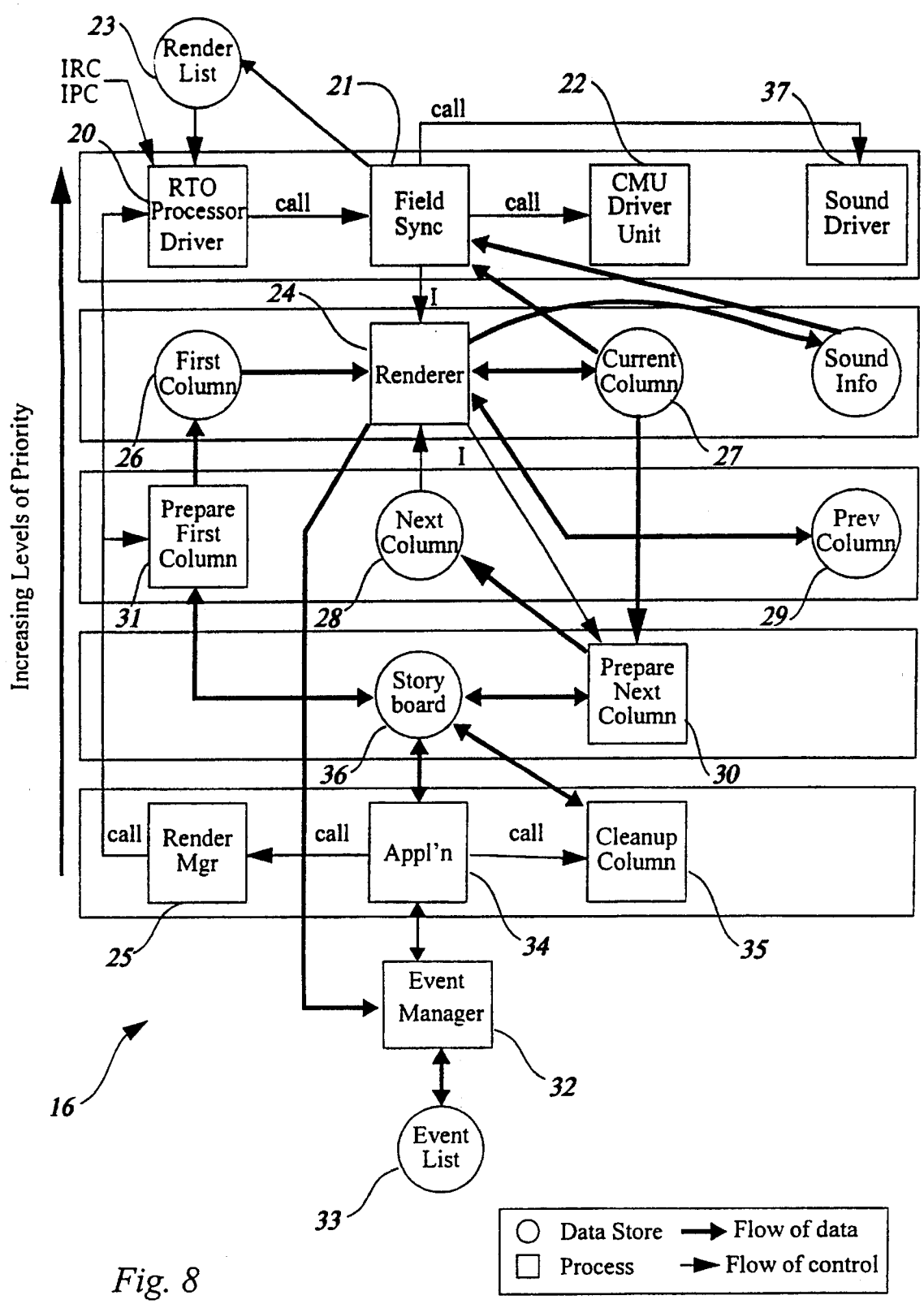
FIG. 8 illustrates the data and process flow in the host processor of the AVAPS when rendering a storyboard.

Referring now to FIG. 7 and FIG. 8, the storyboard system involves the use of several programs or processes and data structures which reside in system RAM 12, system ROM 13 in addition to ROMCards and RAMCards being memory card 14 and memory card 15. These programs and data structures are manipulated by the host processor 11.

FIG. 8 shows the main data and process flow 16 in the host processor 11 of the AVAPS 1 when rendering a storyboard. Data structures are indicated by squares and processes are indicated by circles. The various processes are implemented by means of a multi-tasking operating system and process stack. Each shaded band indicates a runtime priority level of the enclosed processes. Hence, the storyboard application 34 runs at the lowest priority level (i.e. it obtains access to the processor 11 when none of the processes above it are using the processor 11). Each data store and process of FIG. 8 is described below.

Render List

A render list 23 is provided as a list of pointers to the RTO processor 17 object lists to be prepared and subsequently rendered by the RTO processor 17. The list is terminated by a NULL pointer. The rendering of the render list 23 is performed as previously described in the above mentioned Australian Patent Application No. 38244/93, previously incorporated by cross-reference.

The RTO processor driver 20

An RTO processor driver 20 is responsible for displaying the render list 23 via the RTO processor 17. There may be no entries in the render list 23 in which case the image displayed by the RTO processor 17 should be a standard background colour emitted by the RTO processor 17 defined to be at level 0, effects 0.

The RTO processor driver 20 is invoked by various interrupts from the RTO processor 11, including an Image Render Complete and an Image Prepare Complete interrupt, as well as directly by a Render Manager 25 when starting or stopping the rendering process.

After the RTO processor 17 has finished rendering the current field, the RTO processor driver 20 calls a field sync process 21 routine so that any inter-field processing can be accomplished.

The RTO processor driver 20 software runs on the host processor 11 and uses the RTO processor 17 for rendering to the screen, as outlined in the aforementioned patent application.

A display list comprising the objects pointed to by the render list is formed and passed to the RTO processor driver 20 which start the hardware to display the display list to the screen. As well as displaying the display list, the RTO processor driver 20 calls the field sync process 21 on the occurrence of a field blanking sync which allows the application 34 to be called via the event list 33 at every field blanking time. The application 34 and event list 33 are user definable to achieve a particular visual effect. This can be used to update the display list to allow animation to occur. This function can also use the functions of the RTO processor driver 20 to swap the display lists at this time if desired.

If an RTO processor error occurs at any time the RTO processor driver 20 calls a application installed error function. This function accommodates and informs the higher level software that an error has occurred.

Whilst generally the RTO processor driver 20 will be in use at all times, it is not actually required to run continuously.

Once the AVAPS 1 is staged, the RTO processor driver 20 calls an initialization routine which ensures all the required hardware is setup correctly.

The function used to maintain the display list is then installed. This function is called every frame blanking period, by the RTO processor driver 20, and is responsible to ensure that all required modifications to the display list are carried out. This function is passed a single parameter being a pointer to a structure or a class.

The error handling function is also installed at this stage. This function is called when an error in the RTO processor 17 occurs. This function is expected to tidy up and signal the application 34 software that an error has been detected.

Once the initial display list is ready, a call to a renderer 24 is made by the field sync process 21, and the renderer 24 is started. This attaches a function to a RTO processor interrupt.

Once started, the display list is rendered by the RTO processor driver 20. The display list is not, however, static as the renderer 24 is called each frame blanking period and the renderer 24 can modify or replace the display list as required.

If an RTO Processor error occurs, the RTO processor driver 20 will set an internal display list pointer to NULL, causing the screen to go blank on the next field and a error function can be called.

The renderer 24 can then queue an event tier the application 34 which then can determine what should be displayed. The RTO processor driver 20 will continue operation under the assumption that the error function has established the real display list to something appropriate, for example, a NULL, and that the update function will operate correctly on the new display list.

Thus, in an error condition there will be a blank frame displayed and then the RTO processor driver 20 will display whatever the error function has placed in the display list. This could be further blank frames or possibly a pre canned-error message.

In order to display an image to the screen there are a number of functions that must be performed. Firstly, the RTO processor 17 must prepare the image and then it must be rendered to the display, generally a video display unit (VDU). For an image to be displayed continuously it must be prepared and rendered for each field in which it will be displayed. This means that the RTO processor 17 must be preparing the next field as it renders the current one. It also means that there is some delay after a renderer 24 has been called to when the first field can be displayed.

Within the RTO processor driver 20 there are two RTO processor interrupt handlers. One to actually start up the display and one to handle the normal running of the RTO processor 17. The startup handler is responsible for getting the RTO processor 17 going in the render/prepare cycle as well as synchronizing the RTO processor 17 to the appropriate odd/even field. Once configured, the startup handler attaches the normal RTO Processor interrupt handler to allow it to carry on.

The startup handler only displays a dummy image made up of Quadratic Polynomial Fragments (QPF's) upon which the preferred embodiments of RTO technology is based. Thus the screen will be blank until after the RTO processor 17 is operating and the real interrupt handler is used. The time taken to set up the RTO processor 17 can be 5 or 6 fields.

Interrupts from the RTO processor 17 are generated in response to either a render completing, a prepare completing or an error occurring. If the RTO Processor interrupt was caused by a prepare completing, then the display list is checked to see if there are more elements to prepare. If there are more elements to prepare then the next element will be sent to be prepared. Otherwise, a flag is set indicating that the current preparation is complete.

If the RTO Processor interrupt was caused by a render completing then the preparation flag is checked to see if the prepare for the frame about to be rendered has completed. If the prepare is completed then the render for the next field is setup to be started automatically on the next active edge of a filed sync. If the prepare has not completed an error message can be printed to the terminal, if one is connected, and a halt of all processing called.

If the interrupt was caused by an error the handler will check that error against a current set of flags to see whether the error is to be reported. If the error is to be acted upon then the current prepare will be aborted and a prepare of the dummy QPF initiated. The application installed error function will be called. The RTO processor driver 20 assumes that the application installed error function will fix all the problems and so the handler sets itself up to carry on as normal, after displaying the dummy QPF.

The field sync process 21

The field sync process 21 is responsible for synchronizing the renderer 24 with the display device and for ensuring that any sound is adequately sent to the audio channel 18. It further ensures that the renderer 24 fields are updated to the screen in one field blocks.

The first task of the field sync 9 is to synchronize the colours in a colour and mixing unit 19 (CMU), seen in FIG. 7, with the objects being drawn by the RTO processor 17. The RTO processor 17 takes a field to prepare, and then renders in the subsequent field. If it updated the render list 23 being drawn in the previous field, then it must update a colour and mixing unit 19 (FIG. 7) during this field sync so that when the field is rendered, the correct colours will be in the colour and mixing unit 19. The colours cannot be written to the colour and mixing unit 19 when the field is being prepared as a different image may be being rendered which requires different colours. It therefore calls a CMU Driver Unit 10 to install the appropriate colours.

The next task is to call a Sound Driver 37 (FIG. 8) to send the next batch of sound data to audio channel processor 18, seen in FIG. 7.

The next task is to update the render list 23 for the RTO processor driver 20. The field sync process 21 routine checks to see if the renderer 24 has finished calculating the 'next-field' (it may take the renderer 24 many fields to calculate a complicated image). If the 'next-field' is ready, the current column being rendered will be used as a basis for writing a new render list 23, and for submitting a new sound to the Sound Driver 37.

Now that the field sync process 21 process has synchronized with the renderer 24, it clears the 'next-field ready' flag (which the renderer 24 had previously set) and causes a software interrupt which causes the renderer 24 to be invoked once the RTO processor driver and Field-Sync interrupt routines have terminated.

As long as a global 'DisplayFrozen' flag is TRUE, the current field will continue to be displayed (i.e. the 'next-field ready' flag is ignored. This mechanism allows the application 34 to freeze the animation at any field, although any sound will continue to play.

The colour and mixing unit driver 22

The colour and mixing unit driver 22 is responsible for updating the colour and mixing unit 19 using colour entries. It is called by the Field-Sync process.

The sound driver 37

The sound driver 37 is responsible for updating the Audio Unit 18 a little at a time in each field that is rendered for display. It keeps track of how much it has written against how much the audio unit 18 has played, and attempts to update as much as possible in a given field. It has the ability to play a particular sound N times, where N can be a very large number. Only one sound can be active at a time.

Columns

The data and process flow of FIG. 8 also contains information about the current state of a set of clips that are animating in a particular column of a storyboard. There are several types of columns maintained in the system including:

current column 27;

first column 26;

next column 28; and previous (prev.) column 29.

The clip information is comprises a pointer to the clip data, a flag indicating if the clip terminates at the end of the column, a flag indicating if the clip is continuing from the previous column, and a flag to indicate that this is a new column (that hasn't been rendered yet). The different types of columns are described more fully as follows:

The current column 27

This block contains the state information about the various clips that are currently animating in a particular column of a storyboard. It contains the current set of colours, object lists, graphics, handles and sounds as well as information about the attributes that are animating.

The first column 26

This is used to begin an animation starting at a particular column. When this column is ready, the renderer 24 knows to use it to replace current column 27.

The next column 28

This is used to hold the initial state information for the column following current column 27 in the storyboard and the components of current column 27 that no longer continue into the next column. Under normal circumstances, next column 28 will be used to make a new current column 27 and prev column 29 when current column 27 has terminated. If a first column 26 is available instead, then it is used in preference, and the next column 28 is discarded to prev column 29.

The prev column 29

This is used to hold the state information about those previous columns that are no longer being calculated, but are still being displayed by the RTO processor 17 for the next field only.

The renderer 24

The first task for renderer 24 is to cause all the colours that changed last field to be updated, ensuring that by the end of this field the colours will be ready for installation into the colour and mixing unit 19 by the field sync process 21 routine.

The next task for renderer 24 is to take prev column 29 (lists those clips that terminated last field) and queue a Cleanup Event in the event list 33. These can now be safely destroyed since it is at least one field sync since they were marked for termination, and therefore the object lists and colours have all been completely read from memory.

The renderer 24 must also determine if a Notify event should be sent to the application 34 (due to a column being rendered).

The renderer 24 is also responsible for determining that a particular column has finished animating, and replacing the currently animating column by a new column. This can be the next column 28 in the same storyboard, or the First Column of a completely new animation (from the same or a different storyboard). Consequently, the next task that the renderer 24 must perform is to replace the active column by a new one if the current column (current column 27) has expired. Expiration can occur by the column terminating naturally or by a new render instruction via first column 26. The terminating column information is placed into a new prev column 29.

If current column 27 has terminated, the current animation continues while waiting for the next column 28 to be ready. If a first column 26 is available (which also causes current column 27 to terminate), the renderer 24 adds all of the next column 28 to the prev column 29 (as the data must be de-allocated), and makes first column 26 become current column 27. Otherwise the components that are flagged to terminate in current column 27 are placed in prev column 29, and next column 28 is made current column 27. It must also update all the base colours of the clips that are continuing on.

Once the renderer 24 has created a new current column 27, it clears the next-column-ready flag and sends a software interrupt to prepare next column 30 to allow the next column to be calculated.

The final task for renderer 24 is to calculate the next-field to be displayed for the continuing elements of current column 27. As such it evaluates the timelines for the various attributes (including colour, translation, and camera) that describe a particular image (it doesn't need to evaluate the timelines for the first field since the initial values have been evaluated already). When it has calculated the next field's values, it sets a 'next-field ready' flag to inform the Field-Sync routine that the entire column is ready for visual synchronisation.

The prepare first column 31

This module takes a specified column from a storyboard, and generates a first column 26 for renderer 24 to use.

When the first column has been prepared, prepare next column 30 informs renderer 24 via a 'first-field ready' flag.

The prepare next column 30

This process creates the next column from the storyboard after the current column 27 and generates a next column 28 which holds the next column to render, and a prev column 29 which contains the clips to be de-allocated as they will no longer be displayed.

When the next column has been prepared, prepare next column 30 informs renderer 24 via the 'next-field ready' flag.

The storyboard 36

This contains the cell structure of clips and clip markers, together with the various flags that are set by the renderer 24 such as current_column and #active_clips. The application 34 builds and edits storyboards, while the renderer 24 is responsible for rendering them.

The render manager 25

The render manager 25 of FIG. 8 is responsible for all of the high level rendering commands such as Play, Stop, Pause, Continue, and GetErrorMsg. It is called by the application 34.

The application 34

This is the AVAPS application and user-interface. It edits storyboards and plays them via the render manager 25. It reads the event list 33 for actions to perform, some of which are user-driven and some are events from the rendering system. It is also responsible for deallocating the render columns that had been allocated by prepare first column 31 and prepare next column 30.

The cleanup column 35

This is a list of events in priority order that is maintained by the event manager 32. The renderer 24 post events to the event list 33 as required. Events include:

Cleanup events, which indicate a call to the Cleanup Prev Column;

Notify Events, which indicate that the renderer 24 is rendering a particular column; and Error Events which indicate that an internal error has occurred during the render.

Structure of Data Stores

The various data structures manipulated by the various process used in FIG. 8 will now be described in further detail

The render list 23

Referring now to FIG. 9 there is shown an element of the render list. The render list 23 (FIG. 8) is a array of pointers to the RTO processor Object Lists. It indicates which of the RTO processor object lists need to be prepared during the following field. The structure of a single entry is in the following figure. The list is terminated by a NULL pointer. A list containing only contain one pointer (the NULL pointer) is valid.

Sound Information

Referring now to FIG. 10 there is shown the sound information structure. The sound information structure is used by the sound driver 37 (FIG. 8) to produce sound effects during AVAPS animation. Only one sound effect can be produced at any time. When there is sound data available, it is submitted to the sound manager and then cleared out. The sound information structure is as follows:

Sound data is a pointer to the ROMcard sound data that represents one play through of the sound;

Sound duration indicates how many time units the sound runs for when played once; and

Iterations indicates how many times the sound should be played. 0 indicates an infinite number.

Camera Information

Referring now to FIG. 11 there is shown the camera information structure. A single pointer (CurrCamera) points to the current Camera Info structure that is used by the renderer 24 to transform the final view of a scene to screen coordinates. Consequently, only one camera can be active at any one time, and the data used has the following structure:

X Translation is the camera's current X coordinate value;

Y Translation is the camera's current Y coordinate value;

Z Translation is the camera's current Z coordinate value;

Zoom CHTransform is the camera's current zoom coordinate value;

TransChanged is a boolean that indicates if any camera translation value has changed this field;

ZoomChanged is a boolean that indicates if the camera zoom value has changed this field; and TimelineRef points to an ordered set of timeline references to be evaluated, each of which refers to one of the camera's values. This value may be NULL, indicating that there are no timelines to be evaluated.

The Timeline Reference

Figure 12:
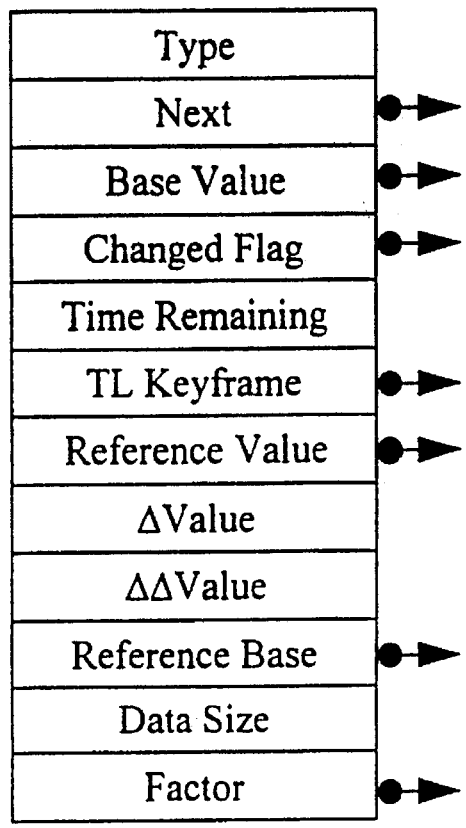
FIG. 12 illustrates a timeline reference structure.

Referring now to FIG. 12 there is shown a timeline reference structure. The timeline reference structure is pointed to by the camera structure of FIG. 11. Each component of the timeline reference handle that is being animated has a number of parts to the transformation. The structure is as follows:

Type determines the type of the data that the timeline refers to. It can be used for bounds checking during timeline evaluation. Valid values are: XTranslation, YTranslation, ZTranslation, Zoom, XScale, YScale, Existence, Object, Luminance, Chrominance, Mix, MinTend, and RndMask;

Next is a pointer to the next timeline reference in the list. A NULL pointer indicates the end of the list;

Base Value is a pointer to a 32 bit value defining the current value of the attribute;

Changed Flag is a pointer to a boolean that is set if the value pointed to by Base Value is updated during the evaluation of the timeline reference;

Time Remaining indicates the number of ticks that remain in the current keyframe before the next keyframe is used;

TL Keyframe points to the keyframe of a timeline (likely in ROM) for the attribute;

Reference Value points to the value being referenced by a keyframe. When the keyframe is first encountered, the address of the value being referenced is stored here for use in calculating based on a reference. When the reference is an external, it points to the location of the value to be used;

ΔValue contains the current value for the Δvalue (velocity where simulated springs are designed to be used) for the keyframe being evaluated;

ΔΔValue contains the current value for the ΔΔvalue (acceleration in the case of simulating springs) for the keyframe being evaluated;

Reference Base is a pointer to the first element to be used as a reference if a timeline's keyframe is a reference. It is used in conjunction with the Data Size to calculate the address of the value being referenced (stored in Reference Value);

Data Size indicates how large the base record is for referencing purposes. The reference address is obtained by adding (Index#* Data Size) to Reference Base; and Factor is a pointer to a factor to use if the handle should be applied to the base value of the attribute. This is only necessary when the attribute is being referred to by a simulated spring. If a timeline times out, and this value is non-NULL, it is attached to the current handle's Apply-Handle list. Non-animating attributes that are referred to by springs are in the handle's initial ApplyHandle list.

The Render Column

Figure 13:
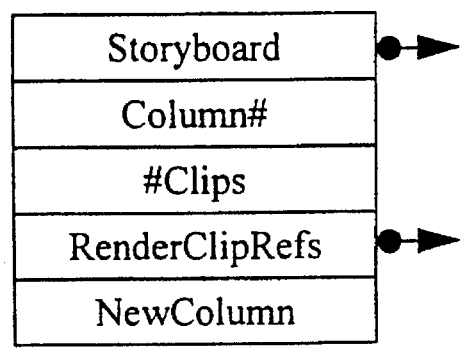
FIG. 13 illustrates the structure of the render column.

Referring now to FIG. 13 there is shown the structure of the render column. The render column defines a column with regards to a storyboard. It has the following structure:

Storyboard is a pointer to the storyboard structure being rendered;

Column# indicates which column of the storyboard is being defined in this Render Column;

Clips indicates how many clips are being animated this column (it also indicates how many Render Clip References will be in the array);

RenderClipRefs is a pointer to an array of Render Clip References, each of which holds the current status of a clip being rendered from the column; and NewColunm indicates if the column is new or not. A new column is one that has only been prepared, not rendered.

The Render Clip Reference

Figure 14:
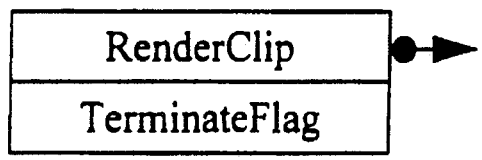
FIG. 14 illustrates the structure of a render clip reference.

Referring now to FIG. 14 there is shown the structure of a render clip reference. Each render clip reference has the following structure:

RenderClip is a pointer to a Render Clip record that holds the current status of the clip being rendered.

TerminateFlag indicates whether the clip will terminate at the end of this column.

Render Clip

Figure 15:
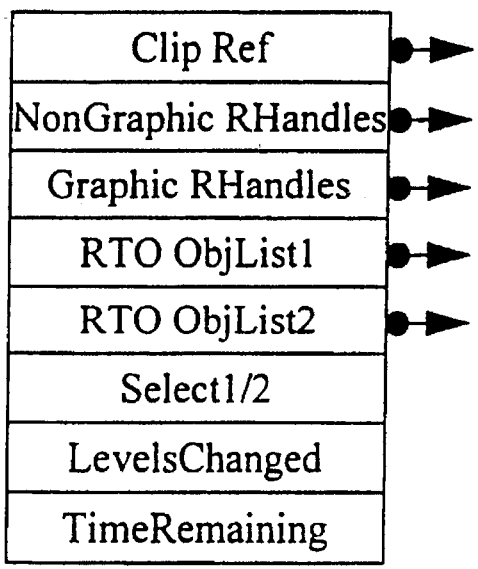
FIG. 15 illustrates the structure of a render clip.

Referring now to FIG. 15 there is shown the structure of a render clip. The render clip record holds the current status of a clip being rendered., It has the following structure:

Clip Ref points to the RAM storyboard clip reference structure that the clip is representative of;

NonGraphic RHandles points to the non-graphic render handles;

Graphic RHandles points to the graphic render handles that are currently animating (i.e. they have completed their delay period). These handles have their timelines evaluated if they are active. Anything delayed will not be visible (so the objects in RTO processorObjList1 and RTO processorObjList2 would both be set to NULL);

RTO processor ObjList1 points to a RTO processor object list that represents a field of an animation;

RTO processor ObjList2 points to a RTO processor object list that represents a second field of an animation;

Select1/2 indicates which of the two RTO processor object lists are being used by which process. RTO processor1Render2 indicates that the RTO processor 17 is reading RTO processorObjList1, and render process is calculating RTO processorObjList2. RTO processor2Render1 indicates that the RTO processor 17 is reading RTO processorObjList2 and the render process is calculating RTO processorObjList1;

LevelsChanged indicates whether the clip's colour levels have changed, implying an update of all other priority levels in the RTO processor object lists and in the colour and mixing unit 19; and TimeRemaining indicates how many fields remain for the clip (0=infinite) before it terminates.

The Base Render Handle

Figure 16:
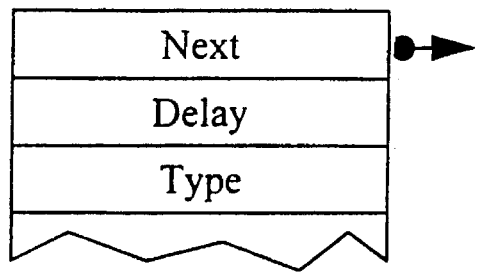
FIG. 16 illustrates the structure of the base render handle.

Referring now to FIG. 16 there is shown the structure of the base render handle. The render handle record holds the current status of a handle within a clip. It has the following structure:

Next is a pointer to the next handle in the list. A NULL pointer indicates there are no more handles in the list;

Delay is the number of ticks before the clip becomes active. When this count is 0, the handle is made active;

Type is one of Sound, Delay, Pause, Camera and Graphic. It indicates the remaining structure of the handle.

The Sound Render Handle

Figure 17:
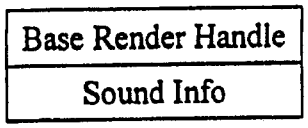
FIG. 17 illustrates the structure of the sound render handle.

Referring now to FIG. 17 there is shown the structure of the sound render handle. When it becomes active, it is submitted to the Sound Manager and then ignored. A sound handle has the following structure Base Render Handle as described previously in the paragraph entitled base render handler; and Sound Info as described previously in the paragraph entitled sound information.

The Delay Render Handle

A delay render handle has no extra data. The delay in the base record would include the delay of the handle. When the delay render handle is made active, it is ignored.

The Pause Render Handle

A pause handle has no extra data. When the pause render handle becomes active, it marks the column as being paused (which means that the column will continue to animate until the pause is satisfied. A pause can be satisfied by either a Continue call to the Render Manager, or if the column terminates and the clip that contains the pause is terminating at the end of the column.

The Camera Render Handle

Figure 18:
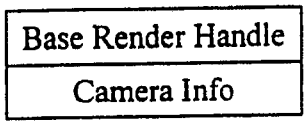
FIG. 18 illustrates the structure of the camera render handle.

Referring now to FIG. 18 there is shown the structure of the camera render handle. The camera render handle contains information necessary for the manipulation of the camera. Its structure is:

Base Render Handle is as described in the previous paragraph entitled 'Base Render Handle'; and Camera Info is described in the previous paragraph entitled Camera Information.

The Graphic Render Handle

Figure 19:
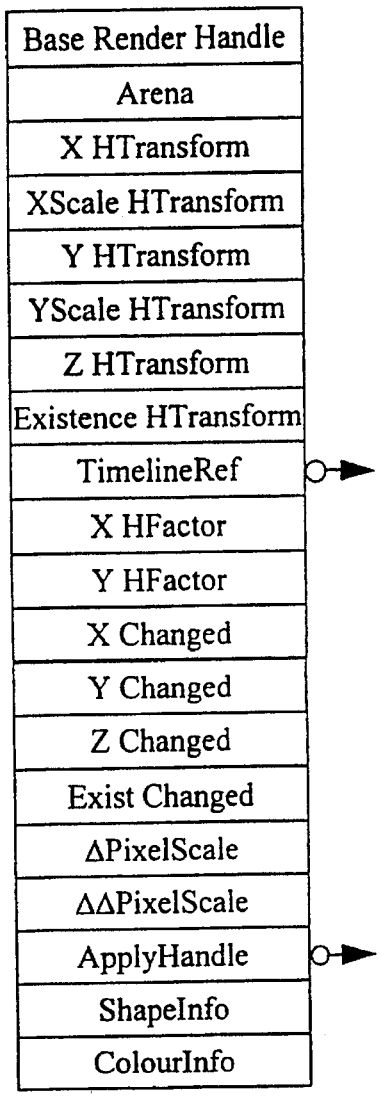
FIG. 19 illustrates the structure of the graphic render handle.

Referring now to FIG. 19 there is shown the structure of the graphic render handle. The graphic render handle contains information necessary to animate a graphic handle and its graphic (and colours if not sharing colours). Its structure is as follows:

Base Render Handle is as described previously;

Arena is one of Foreground, Midground and Background, indicating the animation arena of the graphic;

X HTransform is a Handle Transform structure describing the X transform on the graphic;

XScale HTransform is a Handle Transform structure describing the XScale transform of the graphic. This must follow the X HTransform structure;

Y HTransform is a Handle Transform structure describing the Y transform on the graphic;

YScale HTransform is a Handle Transform structure describing the YScale transform on the graphic. This must follow the Y HTransform structure;

Z HTransform is a Handle Transform structure describing the Z transform on the graphic (valid only if Arena= Midground);

Existence HTransform is a Handle Transform structure defining the visual existence of the graphic;

TimelineRef points to an ordered set of timeline references to be evaluated, each of which refers to one of the handle's attribute values. This pointer may be NULL, indicating that there are no timelines to be evaluated;

X HFactor holds the value (XTranslation/XScale) for use in shape and colour transformation calculations involving simulated springs. It is recalculated whenever an X handle value changes;

Y HFactor holds the value (YTranslation/YScale) for use in shape and colour transformation calculations involving simulated springs. It is recalculated whenever a Y handle value changes;

X Changed is a boolean that is set if either the XTranslation or XScale changed during the field;

Y Changed is a boolean that is set if either the YTranslation or YScale changed during the field;

Z Changed is a boolean that is set if the ZTranslation value changed during the field;

Exist Changed is a boolean that is set if the Exist value changed during the field;

ΔPixelScale is the value to use as the scaling information to place in the RTO processor 17 for each of the shapes in the graphic;

ΔΔPixelScale is the value to use as the scaling information to place in the RTO processor 17 for each of the shapes in the graphic;

Apply Handle points to a set of timeline references, each one referring to a value that is itself not currently animating, but is referred to by an attribute via a simulated spring, and as such, needs to have the handle's transform specifically applied to its Base Value as the handle animates. If the handle is not animating (i.e. TimelineRef is NULL), then Apply Handle is not required to be called;

Shape Info is described below; and

ColourInfo is described below.

The Handle Transform

Referring now to FIG. 20 there is shown the structure of the handle transform. Each component of the handle that is being animated has a number of parts to the transformation. The structure is as follows:

Base Value is a 32 bit value defining the local current value; and

Camera Value is a 32 bit value defining the attribute's value after the camera has been applied to it.

The Shape Information

Referring now to FIG. 21 there is shown the structure of the shape information. The Shape Information is a structure that contains information about the various shapes that are animating in the graphic. The structure is as follows:

Shapes indicates how many shapes represent the graphic;

Shapes points to an array of #Shapes RenderShapes structures. Each one contains the current state of the shape in the graphic;

TimelineRef points to an ordered set of timeline references to be evaluated, each of which refers to one of the shape's attribute values. This pointer may be NULL, indicating that there are no timelines to be evaluated;

RTO processor ObjectList1 is a pointer to the RTO processor objects within the clip's first RTO processor object list; and RTO processor ObjectList2 is a pointer to the RTO processor objects within the clip's second RTO processor object list.

The Colour Info

Referring now to FIG. 22 there is shown the structure of the colour information. Colour Info is a structure that contains information about the colours and effects that are used by the graphic in the handle. Its structure is as follows:

Colours indicates how many colours are stored in the graphic;

Base Colour #indicates the base colour number of the graphic's colours. This number is added to the offset colour to obtain the RTO processor level;

The CMU Colour Group is a pointer to the Colour and Mixing Unit record that defines all the colours for the graphic;

TimelineRef is a pointer to a list of Timeline References that update the values of the colours and effects in the Colour and Mixing Unit Colour Group. If this is NULL, then none of the colours are explicitly animated (blends may be implicitly animated as their handles move);

Animated X Blends is a pointer to a list of animated blend records for blends in X;

Animated Y Blends is a pointer to a list of animated blend records for blends in Y;

Changed Colour is a flag that determines whether any of the colours in the Colour and Mixing Unit Colour Group was updated during the calculation of the next field;

OpaqueEffects indicates how many opaque effects (other than the default one) are stored in the graphic;

Base Effect #indicates how many transparent effects are stored in the graphic.

Base Effect #indicates the base effect number of the graphic's effects. This number is added to the offset effect to obtain the RTO processor effect mode;

Changed Effect is a flag that determines whether any of the effects in the CMU Effect Group was updated during the calculation of the next field; and CMU Effect Group is a pointer to the Colour and Mixing Unit record that defines all the effects for a graphic.

The Animated Blend

Figure 23:
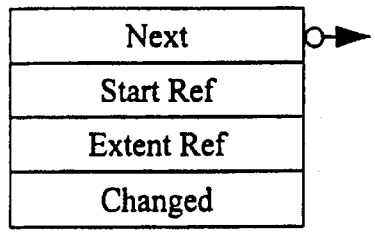
FIG. 23 illustrates the structure of an animated blend.

Referring now to FIG. 23 there is shown the structure of an animated blend. Blends make use of a start and extent value in the direction of the blend. A blend may be defined as static (in a graphic), but the graphic may be placed in a graphic handle that animates. Further, a graphic handle may be in an arena that causes further computation to be performed based on the camera value. The animated blend entry allows the rendering software access to only those blends which may change.

Figure 24:
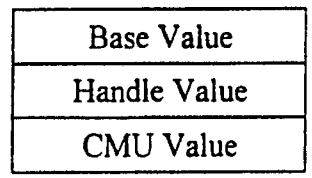
FIG. 24 illustrates the structure of the Start/Extent reference.

Each entry has the following structure:

Next points to the next Animated Blend entry in the list;

Start Ref is a structure that defines the high precision values that are needed to define the start position of the blend. Its structure is described below and shown in FIG. 24;

Extent Ref is a structure that defines the high precision values that are needed to define the extent of the blend. Its structure is described below and shown in FIG. 24; and Changed is a flag that determines if the particular value has been changed via a timeline during the field. If it has changed (or another special circumstance has occurred), then the value must be written to the colour and mixing unit 19 via the CMU Value pointer, FIG. 24 shows the Start Ref and Extent Ref structures which include:

Base Value contains the high precision value of the start or extent amount before any transformation has been applied to the graphic that it is in;

Handle Value contains the high precision value of the start or extent amount after the handle transformation has been applied to the Base Value. It is only calculated if the colour's start or extent is referred to by another colour via a spring; and Colour and Mixing Unit Value is a pointer to the low precision start or extent values actually stored in the Colour and Mixing Unit record.

The Render Shape

Figure 25:
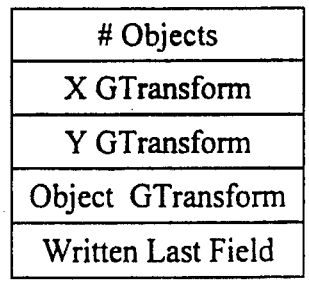
FIG. 25 illustrates the structure of the render shape.

Referring now to FIG. 25 there is shown the structure of the render shape. A render shape represents the current settings of a shape within a particular graphic. It has the following structure:

Objects defines the maximum number of RTO processor objects that comprise the shape;

X GTransform is a Graphic Transform structure defining the current X coordinate of the shape within the graphic;

Y GTransform is a Graphic Transform structure defining the current Y coordinate of the shape within the graphic;

Object GTransform is a Graphic Transform structure defining the current objects used to define the shape within the graphic; and Written Last Field is a set of flags that indicate what new parts of the shape were written to the RTO processor object list last field. The actual information written last field is a combination of what was newly written the field before last, together with the new information that was written last field. This causes propagation of a value from one object list to the next. Each of the bits has a meaning: as indicated in the table below:

| Bit # | Meaning |
| --- | --- |
| 0 | Updated Pixel and Pixel_scale |
| 1 | Updated Line and Line_scale |
| 2 | Updated DelaPixelScale and DeltaDeltaPixelScale |
| 3 | Updated Colour Levels |
| 4 | Updated Object-list (and therefore everything) |
| 5-n | Reserved (must be 0) |

The Graphic Transform

Figure 26:
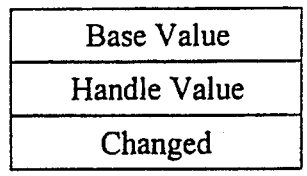
FIG. 26 illustrates the structure of a graphic transform.

Referring now to FIG. 26 there is shown the structure of a graphic transform. Each attribute that is being animated within a graphic has several components to its transformation. The structure is as follows:

Base Value is a 32 bit value defining the local current value of the attribute;

Handle Value is a 32 bit value defining the value of the component after the handle has been applied to the base value. This is only computed if the shape is referred to by another via a simulated spring; and Changed is a boolean that defines whether the Base Value has changed since the last field.

The event list 33

The event list 33 structure of FIG. 8 is private to the event manager 32, but the renderer 24 process are able to post events to the event manager 32 (which are placed in the event list 33). The types of events that are possible are:

Cleanup Event, containing a pointer to the prev column 29 to be cleaned up;

Notify Event, containing the column number that is being rendered; and

RenderError Event, containing the error number that caused the renderer 24 to stop.

The Structure of Processes

Referring again to FIG. 8, the main data and process flow 16 is made up of a number of process as previously described. Each of these process is made up of a number of sub-programs which implement the overall main data and process flow 16.

The following paragraphs setout, in more detailed pseudo code, the overall structure of the computer processes running on the host processor 11, and their interaction with the data structures as previously described.

| Bit # | Meaning |
|---|---|
| 3 | Updated Colour Levels |
| 4 | Updated Object-list (and therefore everything) |
| 5-n | Reserved (must be 0) |

The Graphic Transform

Referring now to Fig. 26 there is shown the structure of a graphic transform. Each attribute that is being animated within a graphic has several components to its transformation. The structure is as follows:

- Base Value is a 32 bit value defining the local current value of the attribute;

- Handle Value is a 32 bit value defining the value of the component after the handle has been applied to the base value. This is only computed if the shape is referred to by another via a simulated spring; and

- Changed is a boolean that defines whether the Base Value has changed since the last field.

The event list 33

The event list 33 structure of Fig. 8 is private to the event manager 32, but the renderer 24 process are able to post events to the event manager 32 (which are placed in the event list 33). The types of events that are possible are:

- Cleanup Event, containing a pointer to the prev column 29 to be cleaned up;

- Notify Event, containing the column number that is being rendered; and

- RenderError Event, containing the error number that caused the renderer 24 to stop.

The Structure of Processes

Referring again to Fig. 8, the main data and process flow 16 is made up of a number of process as previously described. Each of these process is made up of a number of sub-programs which implement the overall main data and process flow 16.

The following paragraphs setout, in more detailed pseudo code, the overall structure of the computer processes running on the host processor 11, and their interaction with the data structures as previously described.

1. The Public Interface of the Render Manager 25

StartUp

*RenderList = NULL

ColourMixingUnitDriver->StartUp()

SoundDriver->StartUp()

ThisColumn.rc = NULL

- 27 -

```
             ThisColumn.NextFieldReady = TRUE
             NextColumn.rc = NULL
             NextColumn.NextFieldReady = TRUE
             FirstColumn.preparing = FALSE
 5           FirstColumn.rc = NULL
             FirstColumn.NextFieldReady = FALSE
             ColumnTerminated = FALSE
             ErrorEncountered = FALSE
             DisplayFrozen = FALSE
10           ColumnPaused = FALSE
             RenderActive = FALSE
             StopRender = FALSE
             RTOProcessorDriver->Startup(& RTO_ProcessorEror, &FieldSync)
     Play Storyboard
15           % Do the old error checking routine...
             if (!sb)
                return InvalidStoryboard
             if (sb->#UnresolvedExternals)
                return UnresolvedReferences
20           if (sb->#UnresolvedClips)
                return ROMCardsNotAvailable
             if (notify AND (column >= sb->#columns))
                return ColumnOutOfRange 25           % Theoretically all is ok... only remains to attempt to play it...
             err = PrepareFirstColumn(sb, column)
             if (err = OK)
                if (notify)
                   ColumnToNotifyWhenReached = notify_column
30              else
                   ColumnToNotifyWhenReached = -1
                RenderActive = TRUE
             return err
     Pause
35           if (RenderActive)
```

- 28 -

```
           if (DisplayFrozen)
               return StoryboardAlreadyPaused
           else
               DisplayFrozen = TRUE
 5             return OK
       else
           return StoryboardNotPlaying
   Continue
       if (RenderActive)
10         % Could be stopped from several sources:
           % Frozen by Pause, or paused by a 'pause' handle. Unfreeze first the
           % entire animation, and then the column animation.
           if (DisplayFrozen)
               DisplayFrozen = FALSE
15         else
               if (ColumnPaused)
                   ColumnPaused = FALSE
                   ColumnTerminated = TRUE
               else
20                 return StoryboardNotPaused
       else
           return StoryboardNotPlaying
   Stop
       % Set the flag that will cause Render to halt at the next logical field
25     if (RenderActive)
           StopRender = TRUE
       else
           return StoryboardNotPlaying
   Notify
30     if (RenderActive AND (rc = ThisColumn.rc)
           if (col > rc->sb.#columns)
               return ColumnOutOfRange
           else
               if ((col < rc->Column#) AND (NotifyIfPastAlready))
35                 Queue Notify Event for col
```

- 29 -

```
                else
                    ColumnToNotifyWhenReached = col
            else
                return StoryboardNotPlaying
5
            2. The Public Interface of the Render Manager 25 to RTO Processor Driver 20
        RTO Processor Error
            % The animation has stopped, so kill the render list
            *RenderList = NULL
10          ErrorEncountered = TRUE
            ErrorType = RTOProcessorError
            ErrorSubType = IntStatus
            RenderActive = FALSE
        Field Sync Process21
15          if (RenderActive)
                update_ColourMixingUnit()
                update_sound()
                if ((ThisColumn.NextFieldReady) AND (! DisplayFrozen))
                    if (RenderActive)
20                      Update RenderList
                        if (CurrSound)
                            submit_sound(CurrSound)
                            CurrSound = NULL
                    ThisColumn.NextFieldReady = FALSE
25                  set software interrupt to enable Render process
        Update RenderList
            For each RenderClip in ThisColumn
                if (GraphicRHandles)
                    if (Select1/2 = RTOProcessor1Render2)
30                      install RTOProcessorObjList2 in RenderList
                        Select1/2 = RTOProcessor2Render1
                    else
                        install RTOProcessorObjList1 in RenderList
                        Select1/2 = RTOProcessor1Render2
35          advance RenderList
```

(RTO24)(259858)

- 30 -

```
         write NULL entry in RenderList
                          3. The Render Process
         % Do this first so that at the next field sync Colour Mixing Unit will update
         % correctly
  5      if (ErrorEncountered)
             Queue ErrorEvent for error that caused 'Stop'
             StopRender = TRUE
             ErrorEncountered = FALSE 10      % Get rid of any old column data
         if (PrevColumn.rc)
             Queue Cleanup Event for PrevColumn.rc
             PrevColumn.rc = NULL 15      % See if its supposed to stop. If so, it is required to must wait until the next
         % column has been fully prepared so that we can delete it
         if (StopRender)
             RenderActive = FALSE
             if (ThisColumn.rc)
 20             if (NextColumn.NextFieldReady)
                    Queue Notify Event for NextColumn.rc
                    NextColumn.rc = NULL
                    Prev.Column.rc = ThisColumn.rc
                    ThisColumn.rc = NULL
 25                 StopRender = FALSE
                else
                    StopRender = FALSE
             ThisColumn.NextFieldReady = TRUE
             return
 30
         % Register this column as being rendered, not just prepared
         tc = ThisColumn.rc
         if (tc)
             Update Colours
 35          tc->NewColumn = FALSE
```

(RTO24)(259858)

-31-

```
            % Notify application of any specific events relating to column
            if (NotifyApplication)
                Queue Notify Event for Column#
                NotifyApplication = FALSE
5
            % A new column may be starting - is it the next of same storyboard, or
            % the first of a new (or same) one?
            if (FirstColumn.preparing AND FirstColumn.NextFieldReady AND
                            NextColumn.NextFieldReady)
10              Queue Cleanup Event for NextColumn
                FirstColumn.preparing = FALSE
                FirstColumn.NextFieldReady = FALSE
                NextColumn.NextFieldReady = FALSE
                PrevColumn.rc = ThisColumn.rc
15              ThisColumn.rc = FirstColumn.rc
                FirstColumn.rc = NextColumn.rc = NULL
                if ((ThisColumn.rc)->Column# = ColumnToNotifyWhenReached)
                    NotifyApplication = TRUE
                    ColumnToNotifyWhenReached = -1
20              Adjust Levels
                ColumnTerminated = FALSE
                set software interrupt to enable NextColumn process
            else
                if (ColumnTerminated AND (NextColumn.NextFieldReady)
25                  NextColumn.NextFieldReady = FALSE
                    PrevColumn.rc = ThisColumn.rc
                    ThisColumn.rc = NextColumn.rc
                    NextColumn = NULL
                    Adjust Levels
30                  ColumnTerminated = FALSE
                    set software interrupt to enable NextColumn process % Finally prepare the next field to be rendered if there is one
            if (ThisColumn.rc)
35              CalcNextField
```

(RTO24)(259858)

- 32 -

```
            ThisColumn.NextFieldReady = TRUE
       Update Colours
            % make sure that the ColourMixingUnitDriver will have the proper colours at the
            % next vblank so that the colours will match the objects being drawn by the RTO
 5          % Processor. It must be the first thing done by Render.
            For each RenderClipRef in ThisColumn
               For each GraphicRHandle in the RenderClip
                  if (LevelsChanged)
                     ColourMixingUnitColourGroup->update_all_colours()
10                   ColourMixingUnitEffectGroup->update_all_effects()
                     ColourInfo.ChangedColour = FALSE
                     EffectInfo.ChangedEffect = FALSE
                  else
                     if (ColourInfo.ChangedColour)
15                      ColourMixingUnitColourGroup->update_animated_colours()
                        ColourInfo.ChangedColour = FALSE
                     if (EffectInfo.ChangedEffect)
                        ColourMixingUnitEffectGroup->update_all_effects()
                        EffectInfo.ChangedEffect = FALSE
20          LevelsChanged = FALSE
       Adjust Levels
            % For each of the clips:
            % Calculate the level number for the clip. If it has changed, update
            % the base level numbers for each of the graphics within the clip.
25          % Remember that the RTO Processor colour level 0 is reserved for black. A handle
            % with a 0 colour usage will reuse the levels from the previous handle.
            % This assumes that there is sufficient colours and effects to allocate.
            % Any higher routine would need to check colour & effect usage pre-render
            ColourBase = 1
30          last_colour_usage = 0
            EffectBase = 0
            TransparentEffectsRemaining = 2
            For each RenderClip in ThisColumn
               lc = FALSE
35             For each GraphicRHandle in the RenderClip
```

(RTO24)(259858)

```
    % Update the colours, flagging the colours that changed
        if (#Colours > 0)
            ColourBase += last_colour_usage
            last_colour_usage = #Colours
5       if (ColourBase != BaseColour#)
            lc = TRUE
            BaseColour# = ColourBase
            ColourMixingUnitColourGroup->set_colour_level(ColourBase)
    % Update the effects, flagging the levels that changed
10      if (#OpaqueEffects)
            EffectBase = 1
        else if (#TransparentEffects)
            TransparentEffectsRemaining -= #TransparentEffects
            EffectsBase = 2 + TransparentEffectsRemaining
15      if (EffectBase != BaseEffect#)
            lc = TRUE
            BaseEffect# = EffectBase
            ColourMixingUnitEffectGroup->set_effect_level(EffectBase)
        clip->LevelsChanged = lc
20 Calc Next Field
        % For each of the clips:
        % First calculate the non-graphic handles
        % Then calculate the camera
        % Finally go through each graphic handle and calculate them
25      For each RenderClip in ThisColumn
            CalcNonGraphicRHandles
        CalcCamera
        For each RenderClip in ThisColumn
            CalcGraphicHandles
30      if (TimeRemaining)
            TimeRemaining--
            if (TimeRemaining = 0)
                ColumnTerminated = TRUE
        CurrCamera->ZoomChanged = CurrCamera->TransChanged = FALSE
35
```

(RTO24)(259858)

- 34 -

<u>Calc Non Graphic RHandles</u>
```
          % These handles are: Camera, Pause, Delay, and Sound.
          % It doesn't matter that the memory pointed to by the handle is left
          % floating when it becomes active since the memory was allocated
5         % in one chunk only
          hptr = &NonGraphicRHandle
          while (handle = *hptr)
            if (handle->Delay > 0)
              handle->Delay--
10          else
              *hptr = handle->next      % disconnect this handle
              switch (handle->type)
              case Sound:
                 CurrSound = &(handle->SoundInfo)
15
              case Delay:
                 Do nothing case Pause:
20               ColumnPaused = TRUE case Camera:
                 CurrCamera = &(handle->CameraInfo)

25          % advance to the next handle to evaluate
            hptr = &(handle->next)
```
<u>Calc Camera</u>
```
          % Calculate the new camera attributes based on CurrCamera
          if (CurrCamera)
30          EvaluateHandleTimelines(&CurrCamera->TimelineRef)
```
<u>Calc Graphic Handles</u>
```
          handle = GraphicRHandle
          while (handle)
            if (handle->Delay > 0)
35             handle->Delay--
```

```
           else
                 EvaluateHandleTimelines(&handle->TimelineRef)
                 ApplyCameraToHandle
                 ApplyHandleToSpringReferences(handle)
 5               CalcShapes
                 CalcColoursAndEffects
                 XChanged = YChanged = ZChanged = ExistChanged = FALSE
           % advance to the next handle to evaluate
           handle = handle->next
10  Apply Camera To Handle
           % Calculate the transform of the camera applied to the handle
           % in the appropriate arena so that when it is required calculate the
           % RTO Processor object transform later we can simply have:
           % RTOProcessorScale = Scale.CameraValue
15         % RTOProcessorTransform = (ShapeTransform * RTOProcessorScale) +
           % Transform.CameraValue
           recalcX = recalcY = FALSE
           switch (arena)
           case Foreground:
20            existence.CameraValue = existence.BaseValue
              if (XChanged)
                 XScale.CameraValue = XScale.BaseValue
                 XTrans.CameraValue = XTrans.BaseValue
                 recalcX = TRUE
25               XHFactor = XTranslation.BaseValue / XScale.BaseValue
              if (YChanged)
                 YScale.CameraValue = YScale.BaseValue
                 YTrans.CameraValue = YTrans.BaseValue
                 recalcY = TRUE
30               YHFactor = YTranslation.BaseValue / YScale.BaseValue case Midground:
              ZTrans.CameraValue = ZTrans.BaseValue - CurrCamera->ZTrans
              if (ZTrans.CameraValue < 1)
35               existence.changed OR = existence.CameraValue
```

- 36 -

```
            existence.CameraValue = FALSE
         else
            existence.CameraValue = existence.BaseValue
         sf = CurrCamera->Zoom / ZTrans.CameraValue
 5       calc = CurrCamera->ZoomChanged OR CurrCamera->TransChanged OR
         ZChanged
            if (calc OR XChanged)
               recalcX = TRUE
               XScale.CameraValue = XScale.BaseValue * sf
10             XTrans.CameraValue = (XTrans.BaseValue - CurrCamera->XTrans) * sf +
                     x_viewport_offset
               XHFactor = XTranslation.BaseValue / XScale.BaseValue
            if (calc OR YChanged)
               recalcY = TRUE
15             YScale.CameraValue = YScale.BaseValue * sf
               YTrans.CameraValue = (YTrans.BaseValue - CurrCamera->YTrans) * sf +
                     y_viewport_offset
               YHFactor = YTranslation.BaseValue / YScale.BaseValue 20       case Background:
            existence.CameraValue = existence.BaseValue
            if (XChanged OR CurrCamera->ZoomChanged)
               recalcX = TRUE
               XScale.CameraValue = XScale.BaseValue * CurrCamera->Zoom
25             XTrans.CameraValue = (XTrans.BaseValue * CurrCamera->Zoom) +
                     x_viewport_offset
               XHFactor = XTranslation.BaseValue / XScale.BaseValue
            if (YChanged OR CurrCamera->ZoomChanged)
               recalcY = TRUE
30             YScale.CameraValue = YScale.BaseValue * CurrCamera->Zoom
               YTrans.CameraValue = (YTrans.BaseValue * CurrCamera->Zoom) +
                     y_viewport_offset
               YHFactor = YTranslation.BaseValue / YScale.BaseValue 35       % Now calculate the DPixelScale and DDPixelScale for the RTO Processor
```

(RTO24)(259858)

```
     % transforms
     if (existence.CameraValue AND (recalcX OR recalcY)
         if (XScale.CameraValue = YScale.CameraValue)
             DPixelScale = 1
5            DDPixelScale = 1 / XScale.CameraValue
         else
             DPixelScale = YScale.CameraValue / XScale.CameraValue
             DDPixelScale = DPixelScale / XScale.CameraValue
  Apply Handle To Spring References
10   % Go through all the components that require updating as they are not
     % animated, but are referred to by springs
     if (handle->XChanged OR handle->YChanged)
         tlr = handle->ApplyHandle
         while (tlr)
15           (tlr->BaseValue)->HandleValue= *(tlr->BaseValue)+ *(tlr->Factor)
             tlr = tlr->next
  Calc Colours And Effects
     % Go through the colour timeline reference list if there is one
     % and update the colours that have changed
20   if (ColourInfo.TimelineRefs)
         EvalGraphicTimelines(&ColourInfo.TimelineRefs)

% Only write to ColourMixingUnitGroup if necessary, but always
     % update high p pos
25   if (handle->Existence.CameraVal)
         % Flush any starts or extents in X to ColourMixingUnitColourGroup.
         % They could have been changed via the timelines
         bref = AnimatedXBlends
         while (bref)
30           if ((recalcX) OR (bref->Changed))
                 *(bref->Start.ColourMixingUnitValue) = low_precision (
                     (bref->Start.BaseVal * handle->XScale.CameraVal) +
                     handle->XTrans.CameraVal)
                 *(bref->Extent.ColourMixingUnitValue) = low_precision(
35                   bref->Extent.BaseVal * handle->XScale.CameraVal)
```

- 38 -

```
              bref->Changed = FALSE
              bref = bref->next

% Flush any starts or extents in Y to Colour Mixing Unit
 5            % ColourGroup.
              % They could have been changed via the timelines
              bref = AnimatedYBlends
              while (bref)
                  if ((recalcY) OR (bref->Changed))
10                    *(bref->Start.ColourMixingUnitValue) = low_precision (
                          (bref->Start.BaseVal * handle->YScale.CameraVal) +
                          handle->YTrans.CameraVal)
                      *(bref->Extent.ColourMixingUnitValue) = low_precision(
                          bref->Extent.BaseVal * handle->YScale.CameraVal)
15                    bref->Changed = FALSE
                  bref = bref->next
       Evaluate Handle Timelines
              % This evaluate timeline references for a handle (be it graphic,
              % camera, or colour component) and therefore is absolute rather than
20            % relative in value.Currently there is no bounds checking on the value.
              % If there's no time remaining then read new keyframes (we're already
              % pointing at the first) until a non-loop keyframe is encountered
              while (tlr = *ptlr)
                  kf = tlr->Keyframe
25                if (tlr->time_remaining <= 0)
                      while ((type = kf->Type) = Loop)
                          kf = tlr->TLKeyframe = PATCH(tlr->TLKeyframe->NextKeyframe)

% Now at a non-loop keyframe, and ready to go. Type discloses
30                    % what sort of keyframe we're at
                      kf = tlr->Keyframe
                      tlr->time_remaining = kf->Time
                      *ChangedFlag = TRUE
                      switch (type)
35                    case External:
```

- 39 -

```
            tlr->ReferenceValue = CurrClip->ClipRef->Externals[kf->Index]
            *BaseValue = *(tlr->ReferenceValue)
        case Independent:
            *BaseValue = kf->Value
5           tlr->DVal = tlr->DDVal = 0
        case Dependent:
            if (kf->Index = ATTACHED_TO_HANDLE)
                tlr->ReferenceValue = &ZeroFactor
            else
10              tlr->ReferenceValue = tlr->ReferenceBase +
                        (kf->Index * tlr->DataSize)
            switch (kf->type)
            case Derived:
                *BaseValue = *(tlr->ReferenceValue)
15          case Rod:
                *BaseValue = *(tlr->ReferenceValue) + kf->Offset
            case Spring:
                *BaseValue = *(tlr->ReferenceValue) + kf->Offset
                        + kf->InitialTranslation
20              tlr->DVal = tlr->InitialVelocity else
    %
    % There is still time remaining in the keyframe, so lets do the calcs
25  %
        switch (kf->type)
        case External:
            val = *(tlr->ReferenceValue)
            if (val != *BaseValue)
30              *BaseValue = val
                *ChangedFlag = TRUE case Independent:
            switch (kf->SubType)
35          case Step:
```

(RTO24)(259858)

- 40 -

```
            Do Nothing
        case Linear:
            *BaseValue += kf->DVal
            *ChangedFlag = TRUE
 5      case Parabolic:
            *BaseValue += tlr->DVal
            tlr->DVal += kf->DDVal
            *ChangedFlag = TRUE
        case Cubic:
10          *BaseValue += tlr->DVal
            tlr->DVal += tlr->DDVal
            tlr->DDVal += kf->DDDVal
            *ChangedFlag = TRUE 15      case Dependent:
            switch (kf->type)
            case Derived:
                val = *(tlr->ReferenceValue)
                if (val != *BaseValue)
20                  *BaseValue = val
                    *ChangedFlag = TRUE
            case Rod:
                val = *(tlr->ReferenceValue) + kf->Offset
                if (val != *BaseValue)
25                  *BaseValue = val
                    *ChangedFlag = TRUE
            case Spring:
                extension = *(tlr->ReferenceValue) + kf->Offset - *BaseValue
                acceleration = kf->Stiffness * extension
30              tlr->DVal = acceleration + (tlr->Dval * kf->Damping)
                if (tlr->Dval != 0)
                    *BaseValue += tlr->Dval % Now that the field has been evaluated, we can decrement the time_remaining
35      % for this timeframe and see if it is required to advance to the next keyframe
```

(RTO24)(259858)

- 41 -

```
            % or simply terminate right here
            tlr->time_remaining--
            if (tlr->time_remaining = 0)
                if (kf->terminate)
5                   *ptlr = tlr->next
                else
                    ptlr = &(tlr->next)
       Evaluate Graphic Timelines
            % It is required to take the graphic handle into account in our calculations
10          % If there's no time remaining then read new keyframes (we're already
            % pointing at the first) until a non-loop keyframe is encountered.,m
            while (tlr = *ptlr)
              kf = tlr->Keyframe
              if (tlr->time_remaining <= 0)
15              while ((type = kf->Type) = Loop)
                    kf = tlr->TLKeyframe = PATCH(tlr->TLKeyframe->NextKeyframe)

% Now we are at a non-loop keyframe, and ready to go. Type tells
                % us what sort of keyframe we're at
20              kf = tlr->Keyframe
                tlr->time_remaining = kf->Time
                switch (type)
                case External:
                    tlr->ReferenceValue = CurrClip->ClipRef->Externals[kf->Index]
25                  val = *BaseValue = *(tlr->ReferenceValue)
                case Independent:
                    val = *BaseValue = kf->Value
                    tlr->DVal = tlr->DDVal = 0
                case Dependent:
30                  if (kf->Index = ATTACHED_TO_HANDLE)
                        tlr->ReferenceValue = &ZeroFactor
                    else
                        tlr->ReferenceValue = tlr->ReferenceBase +
                            (kf->Index * tlr->DataSize)
35              switch (kf->type)
```

(RTO24)(259858)

- 42 -

```
          case Derived:
              val = *BaseVal = (tlr->ReferenceValue)->BaseVal
          case Rod:
              val = *BaseValue = (tlr->ReferenceValue)->BaseVal + kf->Offset
 5        case Spring:
              val = *BaseVal = (tlr->ReferenceValue)->BaseVal + kf->Offset
                  + kf->InitialTranslation
              tlr->DVal = tlr->InitialVelocity
          *ChangedFlag = TRUE
10        *HandleValue = val + *Factor
      else
      %
      % There is still time remaining in the keyframe, so lets do the calcs
      %
15        switch (kf->type)
          case External:
              val = *(tlr->ReferenceValue)
              if (val != BaseVal)
                  *BaseVal = val
20                *ChangedFlag = TRUE
                  *HandleValue = val + *Factor case Independent:
              switch (kf->SubType)
25            case Step:
                  Do Nothing
              case Linear:
                  val = *BaseVal += kf->DVal
                  *ChangedFlag = TRUE
30                *HandleValue = val + *Factor
              case Parabolic:
                  val = *BaseVal += tlr->DVal
                  tlr->DVal += kf->DDVal
                  *ChangedFlag = TRUE
35                *HandleValue = val + *Factor
```

· (RTO24)(259858)

```
         case Cubic:
             val = *BaseVal += tlr->DVal
             tlr->DVal += tlr->DDVal
             tlr->DDVal += kf->DDDVal
5            *ChangedFlag = TRUE
             *HandleValue = val + *Factor case Dependent:
             switch (kf->type)
10           case Derived:
                 val = (tlr->ReferenceValue)->BaseVal
                 if (val != *BaseVal)
                     *BaseVal = val
                     *ChangedFlag = TRUE
15                   *HandleValue = val + *Factor
             case Rod:
                 val = (tlr->ReferenceValue)->BaseVal + kf->Offset
                 if (val != BaseVal)
                     *BaseVal = val
20                   *ChangedFlag = TRUE
                     *HandleValue = val + *Factor
             case Spring:
                 extension = (tlr->ReferenceValue)->HandleValue + kf->Offset -
                             (tlr->BaseValue)->HandleValue
25               acceleration = kf->Stiffness * extension
                 tlr->DVal = acceleration + (tlr->Dval * kf->Damping)
                 if (tlr->Dval != 0)
                     val = *HandleVal += tlr->Dval
                     *BaseVal = val - *Factor 30
             % Now that we've evaluated the field, we can decrement the time_remaining
             % for this timeframe and see if we need to advance to the next keyframe
             % or simply terminate right here.
             % Note that if a timeline ref terminates but is referred to by a spring
35           % then the handles must continue to be applied to the base value for the
```

(RTO24)(259858)

```
        % referencing timelines to make use of (as the handle moves)
        tlr->time_remaining--
        if (tlr->time_remaining = 0)
          if (kf->terminate)
 5          *ptlr = tlr->next
            if (ApplyHandle)
              tlr->next = handle->ApplyHandles
              handle->ApplyHandles = tlr
          else
10          ptlr = &(tlr->next)
    Calculate Shapes
        EvaluateGraphicTimelines(handle->ShapeInfo.TimelineRef)
        olist = (handle->Select1/2 = RTOProcessor1Render2) ?
            handle-> RTOProcessorObjList2: handle-> RTOProcessorObjList1
15      sh = handle->RenderShapes
        count = handle->#shapes
        while (count)
          UpdateShape(sh)
          sh++
20        count--

% Finally set the termination bit on the last of the objects in the list
        SetTerminationBit(olist-1)
    Update Shape (inline)
25      % First determine if we have to write to everything
        % The 'flags' variable should be in a register, so that the writing can
        % be as fast as possible
        if ((handle->ChangedExist) OR (sh->Object.Changed))
          flags OR= 0x1F
30        sh->X.Changed = FALSE
          sh->Y.Changed = FALSE
          sh->Object.Changed = FALSE
        else
          flags = 0x00
35        if (handle->XChanged OR sh->X.Changed)
```

(RTO24)(259858)

- 45 -

```
        sh->X.Changed = FALSE
        flags OR= 0x01
      if (handle->YChanged OR sh->Y.Changed)
        sh->Y.Changed = FALSE
5       flags OR= 0x02
    if (flags)
        flags OR= 0x04
    if (handle->LevelsChanged)
        flags OR= 0x08
10
    % Save what was new this field, and merge with what was new last field
    % to determine what we need to write this field
    temp = flags
    flags OR= sh->WrittenLastField
15  sh->WrittenLastField = temp % Now can update based on the flags
    ocount = sh->#Objects
    if (flags = 0x00)
20      olist += (ocount * sizeof(RTOProcessorObject))
    else
        if (handle->Exists.CameraValue)
            if (flags AND 0x01)
                xval = (sh->X.value * handle->XScale.CameraValue) +
25                     handle->XTrans.CameraValue
                xscale = handle->XScale.CameraValue
            if (flags AND 0x01)
                yval = (sh->Y.value * handle->YScale.CameraValue) +
                       handle->YTrans.CameraValue
30              yscale = handle->YScale.CameraValue
            o = sh->Object.Value
            do
                if (flags AND 0x01)
                    olist->Pixel = x_val
35                  olist->PixelScale = x_scale
```

(RTO24)(259858)

- 46 -

```
            if (flags AND 0x02)
                olist->Line = y_val
                olist->LineScale = y_scale
            if (flags AND 0x04)
 5              olist->DeltaPixelScale = handle->DeltaPixelScale
                olist->DeltaDeltaPixelScale = handle->DeltaDeltaPixelScale
            if (flags AND 0x08)
                e = o->effect
                c = o->colour + handle->ColourInfo.BaseColour#
10              if (e != -1)
                    c OR = (e + handle->ColourInfo.BaseEffect#) << 6
                olist->Colour = c
            if (flags AND 0x10)
                olist->QPFadr = PATCH(o->QPFadr)
15          olist++
        while (--ocount AND (! (o++)->Continues))
        % rest of (or all of) object is invisible, so must be NULLed out
        while (ocount)
            olist->QPFadr = &NullQPF
20          olist++
            ocount--
                        4. Prepare First Column
        % First inform the renderer that we are preparing something to take the
        % place of the currently rendered storyboard/column
25      FirstColumn.preparing = TRUE col = endcol = column % Keep attempting to prepare the first column while there is nothing
30      % in the column, but if we've made the rounds, forget it.
        do
            col++
            err = BuildFirstColumn(sb, col)
        while ((err = NoClipsFound) AND (col != endcol))
35
```

- 47 -

```
          % Now we've either made the rounds, succeeded, or failed.
          if (err = OK)
              FirstColumn.FirstFieldReady = TRUE
          else
 5            FirstColumn.preparing = FALSE
          return err
     Build First Column
          % If an error occurs during the construction of the first column, we
          % can still leave the existing system running, as that will still be ok.
10
          % Try to build the Render Column for the first column to be rendered
          FirstColumn.rc = BuildRenderColumn(sb, column)
          if (FirstColumn.rc = NULL)
              return NotEnoughMemory
15
          % Now go through the actual column, and build each clip for rendering
          % Even if there are cont-markers, we use them as clips
          cell = sb->cells(column)
          count = sb->#rows
20        rcr = (RenderColumnEntry *)((void *)rc + sizeof(RenderColumn))
          while (count)
              if (cell.type = Continuation_Marker OR Clip)
                  rclip = ProcessClip(&(rcr->RenderClip))
                  if (rclip = NULL)
25                    CleanupColumn(rc)
                      return NotEnoughMemory
                  cell->clipref->RenderClip = rcr->RenderClip = rclip
                  rcr->TerminateFlag = (cell->TimeRemaining > 0)
                  rcr++
30            rc->#Clips++
              cell++
              count--
          return OK
                            5. Prepare Next Column
35        col = endcol = ThisColumn->rc->column#
```

(RTO24)(259858)

- 48 -

```
            sb = ThisColumn->rc->sb
            % Keep attempting to prepare the next column while there is nothing
            % in the column, but if we've made the rounds, forget it.
            do
 5             col++
               err = BuildNextColumn(sb, col)
            while ((err = NoClipsFound) AND (col != endcol)

% Now we've either made the rounds, succeeded, or failed.
10          set_priority v.high
            if (err != OK)
               ErrType = err
               ErrSubType = 0
               ErrorEncountered = TRUE
15          NextColumn.NextFieldReady = TRUE
            set_priority back low again
         Build Next Column
            % Try to build the Render Column for the next column to be rendered
            % We need to work out which is the next column to be rendered
20          column = ThisColumn->rc->column# + 1
            sb = ThisColumn->rc->sb
            if (column = sb->#columns)
               column = 0
            NextColumn.rc = BuildRenderColumn(sb, column)
25          if (NextColumn.rc = NULL)
               return NotEnoughMemory % Now go through the actual column, and build each clip for rendering
            cell = sb->cells(column)
30          count = sb->#rows
            rcr = (RenderColumnEntry *)((void *)NextColumn.rc + sizeof(RenderColumn))
            while (count)
               switch (cell.type)
                  case NOTHING:
35                case CLIP_MARKER:
```

- 49 -

```
                rclip = NULL case CLIP:
                rclip = ProcessClip(&(rcr->RenderClip))
 5              if (rclip = NULL)
                    return NotEnoughMemory
                else
                    cell->clipref->RenderClip = rcr->RenderClip = rclip 10          case CONTINUATION_MARKER
                rclip = cell->clipref->RenderClip
                if (rclip = NULL)
                    return StoryboardInvalid
                else
15                  rcr->RenderClip = rclip if (rclip)
                rcr->TerminateFlag = (cell->TimeRemaining > 0)
                rcr++
20              rc->#Clips++
            cell++
            count--
        % Final check to make sure that we have actually got something
        if (rc->#Clips = 0)
25          return NoClipsFound
        return OK
    Build Render Column
        % We don't know how many clips there are in the column, so allocate
        % enough space in case there is one per cell. The extra space is only
30      % two 32 bit words per cell, so it doesn't really matter about the waste.
        rc = alloc(sb->#rows * sizeof (RenderClipRef) + sizeof(RenderColumn))

% We can allocate the RenderClipReferences. Build the main record first
        if (rc)
35          rc->Storyboard = sb
```

- 50 -

```
            rc->Column# = column
            rc->#Clips = 0
            rc->NewColumn = TRUE
            rc->RClipRef = (RenderClipRef *) ((void *)rc + sizeof(RenderColumn))
 5      return rc
     Process Clip
            size = clipref->SizeRequiredForRenderClip
            minmem = alloc(size)
            maxmem = minmem + size
10          if (minmem = NULL)
                return NotEnoughMemory
            % Have allocated enough space for the clip...now can fill it in
            BuildRenderClip
            sb->#ClipsPlaying++
15          return OK Build RenderClip
            % First allocate the RenderClip itself
            rc = (RenderClip *) minmem
20          minmem += sizeof (RenderClip)

% Setup the basic render clip record
            rc->ClipRef = clipref
            FObjSize = clipref->#ObjectsRequired * sizeof (RTOProcessorObject)
25          fobj1 = rc-> RTOProcessorObjList1 = (RTOProcessorObject *)minmem
            minmem += FObjSize
            rc-> RTOProcessorObjList2 = (RTOProcessorObject *)minmem
            minmem += FObjSize
            rc->Select1/2 = RTOProcessor1Render2
30          rc->LevelsChanged = TRUE
            rc->TimeRemaining = clip->Duration
            gr_handle = &(rc->GraphicRHandles)
            ngr_handle = &(rc->NonGraphicRHandles)

35          % Now we go through the clip itself, processing each of the handles
```

(RTO24)(259858)

- 51 -

```
         clip = PATCH(clipref->ClipDirEntry->data)
         BuildLVBTable
         count = clip->#Handles
         h = PATCH(clip->CHB)
 5       convertedHandles = clipref->convertedHandles
         while (count)
            handle = PATCH(*h)
            ProcessHandle(handle->type, handle)
            h++
10          count--

% Close off the end of the various handles now that we've finished
         *ngr_handle = NULL
         *gr_handle = NULL
15   Build LVB Table
         % Builds a table for the clip that details the default and user LVBs for
         % each LVB type. The table is permanently allocated.

% First add the default entries
20       count = clip->#ComponentTypes
         lvb = PATCH(clip->lvb)
         while (count)
            type = lvb->ComponentType
            lvbref[type].#editable
25          lvbref[type].default_lvbs = PATCH(lvb->entries)
            lvb++
            count--

% Now add the user entries
30       count = clipref->#ComponentTypes
         lvb = PATCH(clip->lvb)
         while (count)
            type = lvb->ComponentType
            lvbref[type].user_lvbs = lvb->entries
35          lvb++
```

- 52 -

```
            count--
    Process Delay Handle
            % Potentially builds a delay handle at the end of the available data space
            lvb = ResolveLVBAddress(Delay, handle->lvb#, handle + 1)
5           if (lvb)
                % Not empty, so we add the delay to the current free data area
                % and add the data to the record
                maxmem -= sizeof(RDelayHandle)
                *ngr_handle = rhandle = (RDelayHandle *)(maxmem)
10              rhandle->type = Delay
                rhandle->delay = handle->delay + lvb->delay
                ngr_handle = &(rhandle->next)
    Process Pause Handle
            % Potentially builds a pause handle at the end of the available data space
15          lvb = ResolveLVBAddress(Pause, handle->lvb#, handle + 1)
            if (lvb)
                % Not empty, so we add the pause to the current free data area
                % and add the data to the record
                maxmem -= sizeof(RPauseHandle)
20              *ngr_handle = rhandle = (RPauseHandle *)(maxmem)
                rhandle->type = Pause
                rhandle->delay = handle->delay
                ngr_handle = &(rhandle->next)
    Process Sound Handle
25          % Potentially builds a sound handle at the end of the available data space
            lvb = ResolveLVBAddress(Sound, handle->lvb#, handle + 1)
            if (lvb)
                % Not empty, so we add the sound record, and add the data to it
                maxmem -= sizeof(RSoundHandle)
30              rhandle = (RSoundHandle *)(maxmem)
                data = ResolveDataAddress(lvb)
                rhandle->type = Sound
                rhandle->delay = handle->delay
                rhandle->SoundData = data->SoundData
35              rhandle->SoundDuration = data->Duration
```

(RTO24)(259858)

- 53 -

```
                rhandle->#Iterations = handle->#TimesToPlay
                ngr_handle = &(rhandle->next)
        Process Camera Handle
                % Potentially builds a sound handle at the end of the available data space
5               lvb = ResolveLVBAddress(Camera, handle->lvb#, handle + 1)
                if (!lvb)
                    return
                % Not empty, so we add the camera and add the data to the record
                maxmem -= sizeof(RCameraHandle)
10              rhandle = (RCameraHandle *)(maxmem)
                rhandle->type = Camera
                rhandle->delay = handle->delay
                rhandle->ZoomChanged = rhandle->TransChanged = TRUE
                tlr = &(rhandle->tlr)
15              BuildAbsTimeLineRef(XTranslation, &(handle->Xtrans), &(rhandle->Xtrans),
                        &(rhandle->TransChanged), NULL, 0)
                BuildAbsTimeLineRef(YTranslation, &(handle->Ytrans), &(rhandle->Ytrans),
                        &(rhandle->TransChanged), NULL, 0)
                BuildAbsTimeLineRef(ZTranslation, &(handle->Ztrans), &(rhandle->Ztrans),
20                      &(rhandle->TransChanged), NULL, 0)
                BuildAbsTimeLineRef(ZTranslation, &(handle->Zoom), &(rhandle->Zoom),
                        &(rhandle->ZoomChanged), NULL, 0)
                ngr_handle = &(rhandle->next)
        Process Text Handle
25              % Potentially builds known render handle from the converted text handle
                handle = *convertedHandle
                convertedHandle++
                if (handle != NULL)
                    ProcessHandle(handle->type, handle)
30      Process Graphic Handle
                % Potentially builds a graphic handle at the start of the data space. The
                % graphic's data is stored at the end of the data space. This ensures that
                % the graphic render handles are contiguous so that referencing works.
                lvb = ResolveLVBAddress(Graphic, handle->lvb#, handle + 1)
35              if (!lvb)
```

- 54 -

```
           return

% Not empty, so we add the graphic. First setup the base info
           *grhandle = rhandle = (GraphicRHandle *) minmem
 5         minmem += sizeof(GraphicRHandle)
           grhandle = &(rhandle->next)
           rhandle->type = Graphic
           rhandle->delay = handle->delay
           rhandle->arena = handle->arena
10         if (FirstGHandle = NULL)
               FirstGHandle = rhandle % Now we can copy the handle's timelines as necessary
           tlr = &(rhandle->tlr)
15         BuildAbsTimeLineRef(XTranslation, &(handle->Xtrans), &(rhandle->Xtrans),
                   &(rhandle->XChanged), &(FirstGHandle->Xtrans),
                   sizeof(GraphicRHandle, NULL)
           BuildAbsTimeLineRef(YTranslation, &(handle->Ytrans), &(rhandle->Ytrans),
                   &(rhandle->YChanged), &(FirstGHandle->Ytrans),
20                 sizeof(GraphicRHandle, NULL)
           if (rhandle->arena = MidGround)
               BuildAbsTimeLineRef(ZTranslation,&(handle->Ztrans),&(rhandle->Ztrans),
                   &(rhandle->ZChanged), &(FirstGHandle->Ztrans),
                   sizeof(GraphicRHandle, NULL)
25         else
               rhandle->ZTrans = 1
           BuildAbsTimeLineRef(XScale, &(handle->XScale), &(rhandle->XScale),
                   &(rhandle->XChanged), &(FirstGHandle->XScale),
                   sizeof(GraphicRHandle, NULL)
30         BuildAbsTimeLineRef(YScale, &(handle->YScale), &(rhandle->YScale),
                   &(rhandle->YChanged), &(FirstGHandle->YScale),
                   sizeof(GraphicRHandle, NULL)
           BuildAbsTimeLineRef(Existence, &(handle->Existence),&(rhandle->Existence),
                   &(rhandle->ExistChanged), &(FirstGHandle->Existence),
35                 sizeof(GraphicRHandle, NULL)
```

(RTO24)(259858)

- 55 -

```
            *tlr = NULL

% Now copy the colour and effect information across
            data = ResolveDataAddress(lvb)
5           SetupObjects(data, rhandle)
            SetupColour(data, rhandle)
       Setup Objects
            % allocate the storage for the object pointers
            rhandle-> RTOProcessorObjectList1 = fobj1
10          rhandle-> RTOProcessorObjectList2 = fobj1 + # RTOProcessorObjectsInClip
            shcount = rhandle->#shapes = data->#shapes
            rhandle->WrittenLastField = 0x00
            maxmem -= (data->#shapes * sizeof(Shape))
            first_sh = rsh = rhandle->RenderShapes = maxmem
15          tlr = &(rhandle->tlr)
            sh = PATCH(data->Shapes)
            while (shcount)
               rsh->#Objects = sh->MaxObjectsInShape
               if (sh->SpringConnected)
20                BuildRelTimelineRef(XTrans, &(sh->x), &(rsh->X.BaseVal),
                        &(rsh->X.Changed),
                        &(first_sh->X.BaseVal), sizeof(RShape),&(rhandle->XHFactor))
                  BuildRelTimelineRef(YTrans, &(sh->y), &(rsh->Y.BaseVal),
                        &(rsh->Y.Changed),
25                      &(first_sh->Y.BaseVal), sizeof(RShape), &(rhandle->YHFactor))
               else
                  BuildAbsTimelineRef(XTrans, &(sh->x), &(rsh->X.BaseVal),
                        &(rsh->X.Changed),
                        &(first_sh->X.BaseVal), sizeof(RShape))
30                BuildAbsTimelineRef(YTrans, &(sh->y), &(rsh->Y.BaseVal),
                        &(rsh->Y.Changed),
                        &(first_sh->Y.BaseVal), sizeof(RShape))
                  BuildAbsTimelineRef(Object, &(sh->obj), &(rsh->Obj.BaseVal),
                        &(rsh->Obj.Changed), &(first_sh->obj), sizeof(RShape))
35          fobj1 += rsh->#Objects
```

(RTO24)(259858)

- 56 -

```
           % advance to next shape
           sh++
           rsh++
           shcount--
 5         *tlr = NULL
       Setup Colour
           % Try to re-use the colours if possible. Note that a 'shared' colours
           % with blends is not permitted (it is expanded out) for now.
           if (data->colour = NULL) OR ((lvb->flags.SharedColours AND
10                      (gr_prev_lvb = lvb) AND (!data->hasBlends)))
               ReUseLevels
           else
               gr_prev_lvb = lvb
               tlr = &(rhandle->ColourInfo.tlr)
15             SetupEffectsTLs(data, rhandle)
               SetupColourTLs(data, rhandle)
               *tlr = NULL
       Reuse Levels
           % Reuse the colour and effect levels from the previous graphic
20         % We can't assign real levels yet. Assigning levels happens at render time.
           rhandle->ColourInfo.#Colours = 0
           rhandle->ColourInfo.BaseColour# = 0
           rhandle->ColourInfo.ColourMixingUnitColourGroup = NULL
           rhandle->ColourInfo.TLRefList = NULL
25         rhandle->ColourInfo.#AnimatedBlends = 0
           rhandle->ColourInfo.AnimatedXBlends = NULL
           rhandle->ColourInfo.AnimatedYBlends = NULL
           rhandle->ColourInfo.ChangedColour = FALSE
           rhandle->ColourInfo.#OpaqueEffects = 0
30         rhandle->ColourInfo.#TranspEffects = 0
           rhandle->ColourInfo.BaseEffect# = 0
           rhandle->ColourInfo.ChangedEffect = FALSE
           rhandle->ColourInfo.ColourMixingUnitEffectGroup = NULL
       Setup Effect TLs
35         count = data->#effects
```

(RTO24)(259858)

- 57 -

```
         rhandle->ColourInfo.#Effects = gr_prev_#effects = count
         if (count)
             rhandle->ColourInfo.ColourMixingUnitEffectGroup = new
         ColourMixingUnitEffect(0, count)
5            rhandle->ColourInfo.ChangedEffect = TRUE
             me = &(rhandle->ColourInfo.ColourMixingUnitEfectGroup->EffectEntry[0])
             first_me = me
             e = data->effects
         else
10           rhandle->ColourInfo.ColourMixingUnitEffectGroup = NULL
             rhandle->ColourInfo.ChangedEffect = FALSE % Now do the installing of the effects and possible timelines
         while (count)
15           % Setup the colour tend
             BuildAbsTimeLineRef(Luma, &(e->tend.y),
                     &(me->tend.y), &(rhandle->ColourInfo.EffectsChanged),
                     &(first_me->tend.y), sizeof(ColourMixingUnitEffectEntry))
             BuildAbsTimeLineRef(Chroma, &(e->tend.Cr),
20                   &(me->tend.Cr), &(rhandle->ColourInfo.EffectsChanged),
                     &(first_me->tend.Cr), sizeof(ColourMixingUnitEffectEntry))
             BuildAbsTimeLineRef(Chroma, &(e->tend.Cb),
                     &(me->tend.Cb), &(rhandle->ColourInfo.EffectsChanged),
                     &(first_me->tend.Cb), sizeof(ColourMixingUnitEffectEntry))
25           BuildAbsTimeLineRef(Mix, &(e->tend.mix),
                     &(me->tend.mix), &(rhandle->ColourInfo.EffectsChanged),
                     &(first_me->tend.mix), sizeof(ColourMixingUnitEffectEntry))

% Set up the min tend
30           BuildAbsTimeLineRef(MinTend, &(e->mintend.y),
                     &(me->mintend.y), &(rhandle->ColourInfo.EffectsChanged),
                     &(first_me->mintend.y), sizeof(ColourMixingUnitEffectEntry))
             BuildAbsTimeLineRef(MinTend, &(e->mintend.Cr),
                     &(me->mintend.Cr), &(rhandle->ColourInfo.EffectsChanged),
35                   &(first_me->mintend.Cr), sizeof(ColourMixingUnitEffectEntry))
```

(RTO24)(259858)

- 58 -

```
            BuildAbsTimeLineRef(MinTend, &(e->mintend.Cb),
                    &(me->mintend.Cb), &(rhandle->ColourInfo.EffectsChanged),
                    &(first_me->mintend.Cb), sizeof(ColourMixingUnitEffectEntry))
            BuildAbsTimeLineRef(MinTend, &(e->mintend.mix),
5                   &(me->mintend.mix), &(rhandle->ColourInfo.EffectsChanged),
                    &(first_me->mintend.mix), sizeof(ColourMixingUnitEffectEntry))

% Set up the rnd mask
            BuildAbsTimeLineRef(RndMask, &(e->rndmask.y),
10                  &(me->rndmask.y), &(rhandle->ColourInfo.EffectsChanged),
                    &(first_me->rndmask.y), sizeof(ColourMixingUnitEffectEntry))
            BuildAbsTimeLineRef(RndMask, &(e->rndmask.Cr),
                    &(me->rndmask.Cr), &(rhandle->ColourInfo.EffectsChanged),
                    &(first_me->rndmask.Cr), sizeof(ColourMixingUnitEffectEntry))
15          BuildAbsTimeLineRef(RndMask, &(e->rndmask.Cb),
                    &(me->rndmask.Cb), &(rhandle->ColourInfo.EffectsChanged),
                    &(first_me->rndmask.Cb), sizeof(ColourMixingUnitEffectEntry))
            BuildAbsTimeLineRef(RndMask, &(e->rndmask.mix),
                    &(me->rndmask.mix), &(rhandle->ColourInfo.EffectsChanged),
20                  &(first_me->rndmask.mix), sizeof(ColourMixingUnitEffectEntry))

% advance to next effect
            me++
            count--
25          e++
     Setup Colour TLs
            count = rhandle->ColourInfo.#Colours = data->#colours
            if (count > 0)
                    rhandle->ColourInfo.ColourMixingUnitColourGroup = new
30          ColourMixingUnitColour(0, count)
                    mc = &(rhandle->ColourInfo.ColourMixingUnitColourGroup->ColourEntry[0])
                    first_mc = mc
                    c = data->colours 35          % We have to allocate a lot of space for blends for fast lookup even
```

- 59 -

```
          % though it won't be used very often... such is life... At least we
          % only allocate the space if we have blends at all. Not much else we
          % can do - at least the render will jump to exact members rather than
          % process sequentially
 5        if (data->ContainsBlends)
              maxmem -= (#Colours * sizeof(AnimatedBlend))
              first_ab = blend = (AnimatedBlend *) maxmem
              maxmem -= (#Colours * sizeof(AnimatedBlend))
              first_amix = blend2 = (AnimatedBlend *) maxmem
10        else
              rhandle->ColourInfo.ColourMixingUnitColourGroup = NULL % Keep an eye open for x and y blends
          xbl = &(rhandle->ColourInfo.AnimatedXBlends)
15        ybl = &(rhandle->ColourInfo.AnimatedYBlends)
          while (count)
              % setup the basic colour
              mc->cmode = c->BlendedColour.BlendType
              mc->mmode = c->BlendedMix.BlendType
20            BuildAbsTimeLineRef(Luma, &(c->StartColour.y),
                      &(mc->start.y), &(rhandle.ColourInfo.ColourChanged),
                      &(first_mc->start.y), sizeof(ColourMixingUnitColourEntry))
              BuildAbsTimeLineRef(Chroma, &(c->StartColour.Cr),
                      &(mc->start.Cr), &(rhandle.ColourInfo.ColourChanged),
25                    &(first_mc->start.Cr), sizeof(ColourMixingUnitColourEntry))
              BuildAbsTimeLineRef(Chroma, &c->StartColour.Cb),
                      &(mc->start.Cb), &(rhandle.ColourInfo.ColourChanged),
                      &(first_mc->start.Cb), sizeof(ColourMixingUnitColourEntry))
              BuildAbsTimeLineRef(Mix, &(c->StartColour.mix),
30                    &(mc->start.mix), &(rhandle.ColourInfo.ColourChanged),
                      &(first_mc->start.mix), sizeof(ColourMixingUnitColourEntry))

% Setup the end colour if there's a blend
              if (mc->mode != FlatColour)
35                BuildAbsTimeLineRef(Luma, &(c->EndColour.y),
```

(RTO24)(259858)

- 60 -

```
                &(mc->end.y), &(rhandle.ColourInfo.ColourChanged),
                    &(first_mc->end.y), sizeof(ColourMixingUnitColourEntry))
                BuildAbsTimeLineRef(Chroma, &(c->EndColour.Cr),
                    &(mc->end.Cr), &(rhandle.ColourInfo.ColourChanged),
5                   &(first_mc->end.Cr), sizeof(ColourMixingUnitColourEntry))
                BuildAbsTimeLineRef(Chroma, &(c->EndColour.Cb),
                    &(mc->end.Cb), &(rhandle.ColourInfo.ColourChanged),
                    &(first_mc->end.Cb), sizeof(ColourMixingUnitColourEntry))
                % Setup the blend info
10              if (mc->cmode = XBlend)
                    *xbl = blend
                    xbl = &(blend->next)
                else
                    *ybl = blend
15                  ybl = &(blend->next)
                blend->Start.ColourMixingUnitValue = &(mc->colour.startXY)
                blend->Extent.ColourMixingUnitValue = &(mc->colour.extent)
                BuildAbsTimeLineRef(XTranslation, &(c->colour.StartXY),
                    &(blend->Start.BaseVal), &(blend->Changed)
20                  &(first_ab->Start.baseVal), sizeof(AnimatedBlend))
                BuildAbsTimeLineRef(XTranslation, &(c->colour.Extent),
                    &(blend->Extent.BaseVal), &(blend->Changed)
                    &(first_ab->Extent.BaseVal), sizeof(AnimatedBlend))

25          if (mc->mmode != FlatColour)
                BuildCETimeLineRef(Mix, &(c->EndColour.mix),
                    &(mc->end.mix), &(rhandle.ColourInfo.ColourChanged),
                    &(first_mc->end.mix), sizeof(ColourMixingUnitColourEntry))
                % Setup the blend info
30              if (mc->emode = XBlend)
                    *xbl = blend2
                    xbl = &(blend2->next)
                else
                    *ybl = blend2
35                  ybl = &(blend2->next)
```

- 61 -

```
            blend2->Start.ColourMixingUnitValue = &(mc->mix.startXY)
            blend2->Extent.ColourMixingUnitValue = &(mc->mix.extent)
            BuildAbsTimeLineRef(XTranslation, &(c->StartXY),
                    &(blend->Start.BaseVal), &(blend->Changed)
5                   &(first_amix->Start.baseVal), sizeof(AnimatedBlend))
            BuildAbsTimeLineRef(XTranslation, &(c->Extent),
                    &(blend->Extent.BaseVal), &(blend->Changed)
                    &(first_amix->Extent.BaseVal), sizeof(AnimatedBlend))
            % advance to next colour
10          mc++
            count--
            blend++
            blend2++
            c++
15      % terminate the blend lists
        *xbl = NULL
        *ybl = NULL
                            Common Routines
    Resolve Data Address (inline)
20      % Given an lvb address that points to a possible directory entry structure,
        % calculate the address of the data
        if (lvb.DirEntry.LowerBit = 1)
            data = lvb.DirEntry & 0xFFFFFFFE
        else
25          data = PATCH(lvb.DirEntry->data)
    Resolve LVB Address (inline)
        % Determine the adress of the LVB
        % Parms:
        %   lvb#   : the index into the LVB table
30      %   type   : the type of LVB to find
        %   adr    : the adress following the current handle (in case lvb# = -2)
        if (lvb# >= 0)
            if (lvb# < lvbref[type].#editable)
                lvb = &(lvbref[type].user_lvbs[lvb#])
35              if (! lvb->flags.OverrideDefault)
```

- 62 -

```
            lvb = &(lvbref[type].default_lvbs[lvb#])
         else
            lvb = &(lvbref[type].default_lvbs[lvb#])

5        % There may be no LVB at all
         else if (lvb# = -1)
            lvb = NULL % Final case is when the LVB follows the reference
10       else if (lvb# = -2)
            lvb = adr % If the empty bit is set, there is effectively nothing there
         if (lvb AND (lvb->flags.empty))
15          lvb = NULL return LVB
Build Absolute TimeLine Ref (inline)
         % Builds a Timline Reference based on data (timelines build up from bottom)
20       % while the data builds down from top. The 'abs' stands for absolute,
         % indicating that there is no need for a special factor to be taken
         % into account for spring calculations.
         % Type   : of data
         % Source : address of source data
25       % Dest   : address of dest value
         % CFlag  : address of changed flag to set when the value changes
         % BaseVal : address of first structure for reference purposes
         % DataSize: size of each similar structure (to be added for references)
         if (*source = 0)
30          *dest = *source
            *changed = TRUE
         else
            maxmem -= sizeof(TimelineReference)
            tlr = *tlr = maxmem
35          tlr->Type = type
```

(RTO24)(259858)

- 63 -

```
            tlr->TimeRemaining = 0
            tlr->BaseValue = dest
            tlr->ChangedFlag = cflag
            tlr->TLKeyframe = PATCH(*source) AND FFFFFFFE
5           tlr->BaseVal = BaseVal
            tlr->DataSize = DataSize
            tlr = &(tlr->next)
            tlr->Factor = NULL
        % The following are not required
10      %   tlr->ReferenceBase = NULL
        %   tlr->DValue = 0
        %   tlr->DDValue = 0
    Build Relative TimeLine Ref (inline)
        % Builds a Timline Reference based on data (timelines build up from bottom)
15      % while the data builds down from top. The 'abs' stands for relative,
        % indicating that there is a need for a special factor to be taken
        % into account for spring calculations.
        % Type    : of data
        % Source  : address of source data
20      % Dest    : address of dest value
        % CFlag   : address of changed flag to set when the value changes
        % BaseVal : address of first structure for reference purposes
        % DataSize: size of each similar structure (to be added for references)
        % Factor  : address of scaling factor to use for springs
25      if (*source = 0)
            *dest = *source
            *changed = TRUE
            if (Factor)
                maxmem -= sizeof(TimelineReference)
30              *ftlr = maxmem
                ftlr->BaseVal = BaseVal
                ftlr->Factor = Factor
                ftlr = &(ftlr->next)
            else
35              maxmem -= sizeof(TimelineReference)
```

- 64 -

```
            tlr = *tlr = maxmem
            tlr->Type = type
            tlr->TimeRemaining = 0
            tlr->BaseValue = dest
5           tlr->ChangedFlag = cflag
            tlr->TLKeyframe = PATCH(*source) AND FFFFFFFE
            tlr->BaseVal = BaseVal
            tlr->DataSize = DataSize
            tlr = &(tlr->next)
10          tlr->Factor = Factor
        % The following are not required
        %   tlr->ReferenceBase = NULL
        %   tlr->DValue = 0
        %   tlr->DDValue = 0
15   Clean Up Column
        % We go through each of the entries and delete the ones that we have
        % finished with. Anything that is terminating can be cleaned up, and
        % anything in a new column can be cleaned up.
        For each entry in Column
20          if (TerminateFlag OR NewColumn)
                CleanupClip % Finally we can deallocate the column itself
        delete column
25   Cleanup Clip
        Storyboard->ClipsPlaying--
        For each Graphic RHandle in the RenderClip
            delete ColourInfo.ColourMixingUnitColourGroup
            delete ColourInfo.ColourMixingUnitEffectGroup
30
        % Finally cleanup the clip memory itself
        delete RenderClip 7. Calculate Render Clip Requirements
35      % Go through the clip and calculate the requirements for the RenderClip
```

```
     % version of it. Specifically:
     % (a) how many colours are required
     % (b) how many opaque effects are required
     % (c) how many transparent effects are required
5    % (d) how many RTOProcessor objects are required
     % (e) how much space for the RenderClip is required
     SetupCounts
     if (clipref->Resolved)
        CalcRequirements
10   UpdateRequirements
  Setup Counts
     % Assume that there are no requirements as yet
     ColourUsage = 0
     OpaqueEffectsUsage = 0
15   TransparentEffectsUsage = 0
     RTOProcessorObjectCount = 0
     mem = 0
  Update Requirements
     % Write the RenderClip requirements back to the clip reference
20   clipref->ColourUsage = ColourUsage
     clipref->#OpaqueEffects = OpaqueEffectsUsage
     clipref->#TranspEffects = TransparentEffectsUsage
     clipref-># RTOProcessorObjects = RTOProcessorObjectCount
     clipref->MemForRenderClip = mem
25 Calculate Requirements
     clip = PATCH(clipref->ClipDirEntry->data)
     lvbref = BuildLVBTable
     count = clip->#Handles
     convertedHandles = clipref->convertedHandles
30   h = PATCH(clip->CHB)
     while (count)
        handle = PATCH(*h)
        CalcHRequirements(handle->type, handle)
        h++
35      count--
```

(RTO24)(259858)

- 66 -

```
         % If eveything is empty, there may not even be a clip!
         if (mem)
             mem += sizeof(RenderClip)
 5       Calculate Delay Handle Requirements
             if (ResolveLVBAddress(Delay, handle->lvb#, handle + 1))
                 mem += sizeof(RDelayHandle)
         Calculate Pause Handle Requirements
             if (ResolveLVBAddress(Pause, handle->lvb#, handle + 1))
10               mem += sizeof(RPauseHandle)
         Calculate Sound Handle Requirements
             if (ResolveLVBAddress(Sound, handle->lvb#, handle + 1))
                 mem += sizeof(RSoundHandle)
         Calculate Camera Handle Requirements
15           if (ResolveLVBAddress(Camera, handle->lvb#, handle + 1)
                 mem += sizeof(RCameraHandle)
         Calculate Graphic Handle Requirements
             lvb = ResolveLVBAddress(Graphic, handle->lvb#, handle + 1)
             if (!lvb)
20               return
             mem += sizeof(RGraphicHandle)

% Now add space for timelines
         AddAbsTLRequirements(&XTranslation)
25       AddAbsTLRequirements(&YTranslation)
         if (handle->arena = Midground)
             AddAbsTLRequirements(&ZTranslation)
         AddAbsTLRequirements(&XScale)
         AddAbsTLRequirements(&YScale)
30       AddAbsTLRequirements(&Existence)

% We gather the 'data' pointer (to the graphic)
         data = ResolveDataAddress(lvb)
         CalcObjects(data)
35
```

(RTO24)(259858)

```
     % Now calculate requirements for colours and effects too, only concerned
     % with non-sharing colours. Having no colours is automatically sharing
     % with previously defined colours
     if (data->colours AND
5           ((!lvb->flags.SharedColours) OR (gr_prev_lvb != lvb)))
        gr_prev_lvb = lvb
        CalcEffects(data)
        CalcColours(data)
   Calculate Objects
10    % Now allocate the space for the effects
      count = data->#Shapes
      s = data->Shapes
      while (count)
          mem += sizeof(RenderShape)
15        BuildAbsTimeLine(&s->Object)
          BuildAbsTimeLine(&s->XTranslation)
          BuildAbsTimeLine(&s->YTranslation)
          o = s->MaxObjectsInShape
          RTOProcessorObjectCount += o
20        mem += o * sizeof(RTOProcessorObject) * 2
          s++
          count--
   Calculate Effects
      % Now allocate the space for the effects
25    e = data->#OpaqueEffects
      OpaqueEffectsUsage += e
      e += data->#TranspEffects
      TransparentEffectsUsage += data->#TranspEffects
      effect = data->Effects
30    while (e)
          BuildAbsTimeLine(&effects->tend.y)
          BuildAbsTimeLine(&effects->tend.Cr)
          BuildAbsTimeLine(&effects->tend.Cb)
          BuildAbsTimeLine(&effects->tend.mix)
35
```

(RTO24)(259858)

- 68 -

```
         BuildAbsTimeLine(&effects->mintend.y)
         BuildAbsTimeLine(&effects->mintend.Cr)
         BuildAbsTimeLine(&effects->mintend.Cb)
         BuildAbsTimeLine(&effects->mintend.mix)
5
         BuildAbsTimeLine(&effects->rndmask.y)
         BuildAbsTimeLine(&effects->rndmask.Cr)
         BuildAbsTimeLine(&effects->rndmask.Cb)
         BuildAbsTimeLine(&effects->rndmask.mix)
10
      e--
      effect++
   Calculate Colour
      % Allocate enough space for the colours
15    c = data->#Colours)
      ColourUsage += c
      if (data->ContainsBlends)
         mem += (c * sizeof(AnimatedBlend) * 2)
      col = data->Colours
20    while (c)
         BuildAbsTimeLine(&col->StartColour.y)
         BuildAbsTimeLine(&col->StartColour.Cr)
         BuildAbsTimeLine(&col->StartColour.Cb)
         BuildAbsTimeLine(&col->StartColour.mix)
25
         if (col->BlendedColour.BlendType != FlatColour)
            BuildAbsTimeLine(&col->EndColour.y)
            BuildAbsTimeLine(&col->EndColour.Cr)
            BuildAbsTimeLine(&col->EndColour.Cb)
30          BuildAbsTimeLine(&col->EndColour.mix)
            BuildAbsTimeLine(&col->colour.Extent)
            mem += sizeof(TimeLineReference)    % for startXY (always TL)
         if (col->BlendedMix.BlendType != FlatColour)
            BuildAbsTimeLine(&col->mix.Extent)
35       mem += sizeof(TimeLineReference)    % for startXY (always TL)
```

(RTO24)(259858)

-69-

```
            c--
            col++
    Add Absolute TL Requirements
            if (*source AND 0x01) = NULL)
5               mem += sizeof(TimeLineReference)
    Calculate Text Handle Requirements
            % We convert the text handle to be a graphic handle, and then calculate
            % the requirements of the graphic handle. We increment the current position
            % in the convertedHandles list so that the next handle that requires
10          % converting will be ok
            ConvertTextToGraphic(convertedHandles, textHandle)
            handle = *convertedHandles
            convertedHandles++
            if (handle != NULL)
15              CalcHRequirements(handle->type, handle)
            convertedHandles++
```

The forgoing describes only one embodiment of the present invention and modifications, obvious to those skilled in the art can be made thereto without departing
20 from the scope of the present invention.

(RTO24)(259858)

The forgoing describes only one embodiment of the present invention and modifications, obvious to those skilled in the art can be made thereto without departing from the scope of the present invention.

We claim:

1. An automated storyboard rendering system for the reproduction of a storyboard using a real-time processor on a reproduction device, said storyboard comprising a number of columns each containing references to a plurality of information clips intended for reproduction, each of said plurality of information clips extending over a plurality of image frames displayed by said reproduction device, wherein the plurality of information clips for a given column are displayed simultaneously, said system comprising:

current column determination means adapted to determine those information clips that are intended for reproduction, and thereby active, in a current column, and if said current column includes at least one active information clip, identifying said current column as an active column and automatically adjusting a duration of the other clips in said current active column to be the same as a shortest duration of one of said active information clips, and column rendering means connected to said column determination means and adapted to receive a current active column and to then simultaneously render in real-time those active information clips in said current active column on said reproduction device.

2. A system as claimed in claim 1 wherein at least one of said columns has a multiplicity of simultaneously active clips, said column rendering means renders said simultaneously active clips in a predetermined reproduction order.

3. A system as claimed in claim 2 wherein said clips are stored within a sequencing order in said columns and said reproduction order has a predetermined correspondence to said sequencing order.

4. A system as claimed in claim 1 wherein said information clips extend across multiple columns so as to be active in multiple ones of said columns.

5. A system as claimed in claim 1 wherein said system further comprises means for simultaneously terminating different information clips which are active in the same column.

6. A system as claimed in claim 1 wherein said current column determination means includes means for initiating rendering of said storyboard at an arbitrary initial column.

7. A system as claimed in claim 1 further comprising means for pausing and continuing said rendering at arbitrary points in time.

8. A system as claimed in claim 1 wherein said information clips comprise audio information.

9. A system as claimed in claim 1 wherein said information clips comprise displayable image information.

10. A system as claimed in claim 1 wherein said information clips are animation clips configured for reproduction by display on a display device.

11. A system as claimed in claim 10 wherein said column rendering means includes said real-time processor which renders said active information clips on said display device in real time.

12. A system as claimed in claim 10 wherein said display occurs in a frame by frame order and said column rendering means begins rendering subsequent frames before the current frame has completed display.

13. A system as claimed in claim 11 wherein said real-time processor is capable of rendering object-based graphic image data in real-time.

14. A system as claimed in claim 10 wherein each animation clip includes audio information and said column rendering means includes audio output and audio timing information.

15. A system as claimed in claim 14 wherein said column rendering means outputs said audio output and audio timing information on a frame by frame basis.

16. A system as claimed in claim 10 wherein said column rendering means includes a colour table update means adapted to update a colour table so that it corresponds to the colours used in the currently active column.

17. A system as claimed in claim 10 wherein said animation clips are made up of graphic objects and said objects are stored in an object-based data format.

18. An automated storyboard rendering systems, for the reproduction of a storyboard using a real-time processor on a reproduction device, said storyboard comprising a number of columns each containing references to a plurality of information clips intended for reproduction by said reproduction device, said system comprising:

current column determination means adapted to determine those information clips that are intended for reproduction, and thereby active, in a current column, and if said current column includes at least one active information clip, identifying said current column as an active column and automatically adjusting a duration of the other clips in said current active column to be the same as a shortest duration of one of said active information clips, and column rendering means connected to said column determination means and adapted to receive a current active column and to then simultaneously render in real-time those active information clips in said current active column on said reproduction device.

\* \* \* \* \*

UNITED STATES PATENT AND TRADEMARK OFFICE
CERTIFICATE OF CORRECTION

PATENT NO. : 5,604,857

DATED : February 18, 1997

INVENTOR : SIMON R. WALMSLEY

It is certified that error appears in the above-identified patent and that said Letters Patent is hereby corrected as shown below:

ON TITLE PAGE
Item's
[54] Line 3, "REAL TIME" should read --REAL-TIME--.
[76]      "[76] Inventor:" should read
          --[75] Inventor:--.
[73] Assg.  Insert: "[73] Assignee: Canon Information Systems Research Australia Pty Ltd., New South Wales 2113, Australia and Canon Inc., Tokyo, Japan.".

IN THE DRAWINGS

Sheet 2 of 12, FIG. 2, "synchronisation" should read
      --synchronization--.

COLUMN 1

Line 3, "REAL TIME" should read --REAL-TIME--.

COLUMN 2

Line 13, "real time" should read --real-time--;
   Line 18, "a" should read --an--;
   Line 19, "real time" should read --real-time--;
   Line 38, "real time." should read --real-time.--.

UNITED STATES PATENT AND TRADEMARK OFFICE
CERTIFICATE OF CORRECTION

PATENT NO. : 5,604,857

DATED : February 18, 1997

INVENTOR : SIMON R. WALMSLEY

It is certified that error appears in the above-identified patent and that said Letters Patent is hereby corrected as shown below:

COLUMN 4

Line 16, "clips," should read --clips.--;
  Line 17, "decided" should read --decide--.

COLUMN 6

Line 44, "Real Time" should read --Real-Time--.

COLUMN 9

Line 22, "a" should read --an--;
  Line 25, "Whilst" should read --While--;
  Line 32, "every frame blanking" should read --every-frame-blanking--;
  Line 35, "This function is passed a single paramter being" should read --This function is passed as a single parameter, since it is--;
  Line 54, "a" should read --an--;
  Line 66, "pre canned-" should read --pre-canned--.

COLUMN 11

Line 56, "is" should be deleted.

UNITED STATES PATENT AND TRADEMARK OFFICE
CERTIFICATE OF CORRECTION

PATENT NO. : 5,604,857

DATED : February 18, 1997

INVENTOR : SIMON R. WALMSLEY

It is certified that error appears in the above-identified patent and that said Letters Patent is hereby corrected as shown below:

COLUMN 14

Line 8, "detail" should read --detail.--;
  Line 17, "contain one pointer" should read --one pointer--;
  Line 33, "indicates" should read --indicate--.

COLUMN 15

Line 8, "32 bit" should read --32-bit--.

COLUMN 16

Line 11, "rendered.," should read --rendered.--;
  Line 13, "of;" should read --of:--;
  Line 62, "structure" should read --structure;--;
  Line 64, "handler;" should read --handle;--.

COLUMN 18

Line 31, "32 bit" should read --32-bit--;
  Line 33, "32 bit" should read --32-bit--.

UNITED STATES PATENT AND TRADEMARK OFFICE
CERTIFICATE OF CORRECTION

PATENT NO. : 5,604,857

DATED : February 18, 1997

INVENTOR : SIMON R. WALMSLEY

It is certified that error appears in the above-identified patent and that said Letters Patent is hereby corrected as shown below:

COLUMN 19

Line 1, "#indicates" should read --# indicates--;
  Line 22, "#indicates" should read --# indicates--;
  Line 24, "#indicates" should read --# indicates--.

COLUMN 20

Line 36, "DelaPixelScale" should read --DeltaPixelScale--;
  Line 48, "32 bit" should read --32-bit--;
  Line 50, "32 bit" should read --32-bit--;
  Line 60, "process are" should read --process is--.

COLUMN 21

Line 6, "process" should read --processes--;
  Line 7, "process" should read --processes--.

COLUMN 22

Line 4, "setout," should read --set out,-- and
        "pseudo code," should read --pseudo-code,--.

UNITED STATES PATENT AND TRADEMARK OFFICE
CERTIFICATE OF CORRECTION

PATENT NO. : 5,604,857

DATED : February 18, 1997

INVENTOR : SIMON R. WALMSLEY

It is certified that error appears in the above-identified patent and that said Letters Patent is hereby corrected as shown below:

COLUMN 23-24

Line 1-30 "-26-" should be deleted; and lines 1-30 should be deleted (repeated).

Line 37, "(RTO24)(259858)" should be deleted.

COLUMNS 25-110

Lines 27-69, Page numbers and reference code numbers (at the bottom of the page) should be deleted.

COLUMN 35

Line 27, "is" should read --are--.

Signed and Sealed this

Ninth Day of September, 1997

Attest:

BRUCE LEHMAN

Attesting Officer     Commissioner of Patents and Trademarks